(12) United States Patent
Fulton

(10) Patent No.: US 10,046,628 B1
(45) Date of Patent: Aug. 14, 2018

(54) EXTENDABLE AND RETRACTABLE TRUCK CAP

(71) Applicant: Job Fulton, Franklinville, NY (US)

(72) Inventor: Job Fulton, Franklinville, NY (US)

( * ) Notice: Subject to any disclaimer, the term of this patent is extended or adjusted under 35 U.S.C. 154(b) by 0 days.

(21) Appl. No.: 15/601,520

(22) Filed: May 22, 2017

Related U.S. Application Data

(60) Provisional application No. 62/340,391, filed on May 23, 2016.

(51) Int. Cl.
| | |
|---|---|
| *B60J 7/06* | (2006.01) |
| *B62D 33/08* | (2006.01) |
| *B62D 33/027* | (2006.01) |
| *B60P 3/42* | (2006.01) |

(52) U.S. Cl.
CPC .............. *B60J 7/067* (2013.01); *B60P 3/42* (2013.01); *B62D 33/027* (2013.01); *B62D 33/08* (2013.01)

(58) Field of Classification Search
CPC ... B60J 7/024; B60J 7/042; B60J 7/062; B60J 7/067; B60J 7/068; B60P 3/42; B62D 33/08; B62D 33/023; B62D 33/027
USPC .... 296/98, 100.12, 10, 26.04, 26.05, 32, 36, 296/99.1, 186.2; 160/133, 266
See application file for complete search history.

(56) References Cited

U.S. PATENT DOCUMENTS

| | | | | |
|---|---|---|---|---|
| 2,992,038 A | * | 7/1961 | Manganello | B62D 33/08 296/36 |
| 3,233,936 A | * | 2/1966 | Jakosky | B60R 5/042 296/26.05 |
| 3,298,731 A | * | 1/1967 | Sangimino | B60J 1/085 296/219 |
| 4,848,830 A | * | 7/1989 | Parson | B60J 7/041 296/100.05 |
| 5,161,593 A | * | 11/1992 | Hirabayashi | E06B 9/1703 160/120 |
| 6,886,877 B1 | * | 5/2005 | Plavetich | B62D 33/0273 296/186.3 |
| 7,404,586 B2 | * | 7/2008 | Seiberling | B60J 7/067 296/100.09 |

* cited by examiner

*Primary Examiner* — Dennis H Pedder
(74) *Attorney, Agent, or Firm* — Del Vecchio and Stadler LLP

(57) ABSTRACT

An extendable and retractable truck cap for a truck having a bed assembly having opposed first and second bed sidewalls that define first and second sidewall recesses, and having a cross wall that defines a cross wall recess. Extendable and retractable post assemblies are mounted on the bed in the first and second wall recesses and wall raising arms are mounted thereon. The wall raising arms raise and lower first and second roll-up sidewalls. A roll-up cover wall is disposed in the cross wall recess and are movable over the wall raising arms thus protecting the bed. In another embodiment there is provided an extendable and retractable panel cap where in the roll-up sidewalls are replaced with first and second cap panels. In another embodiment there is an extendable and retractable cab deployable panel cap having a cab panel that is extendable retractable over the bed.

17 Claims, 23 Drawing Sheets

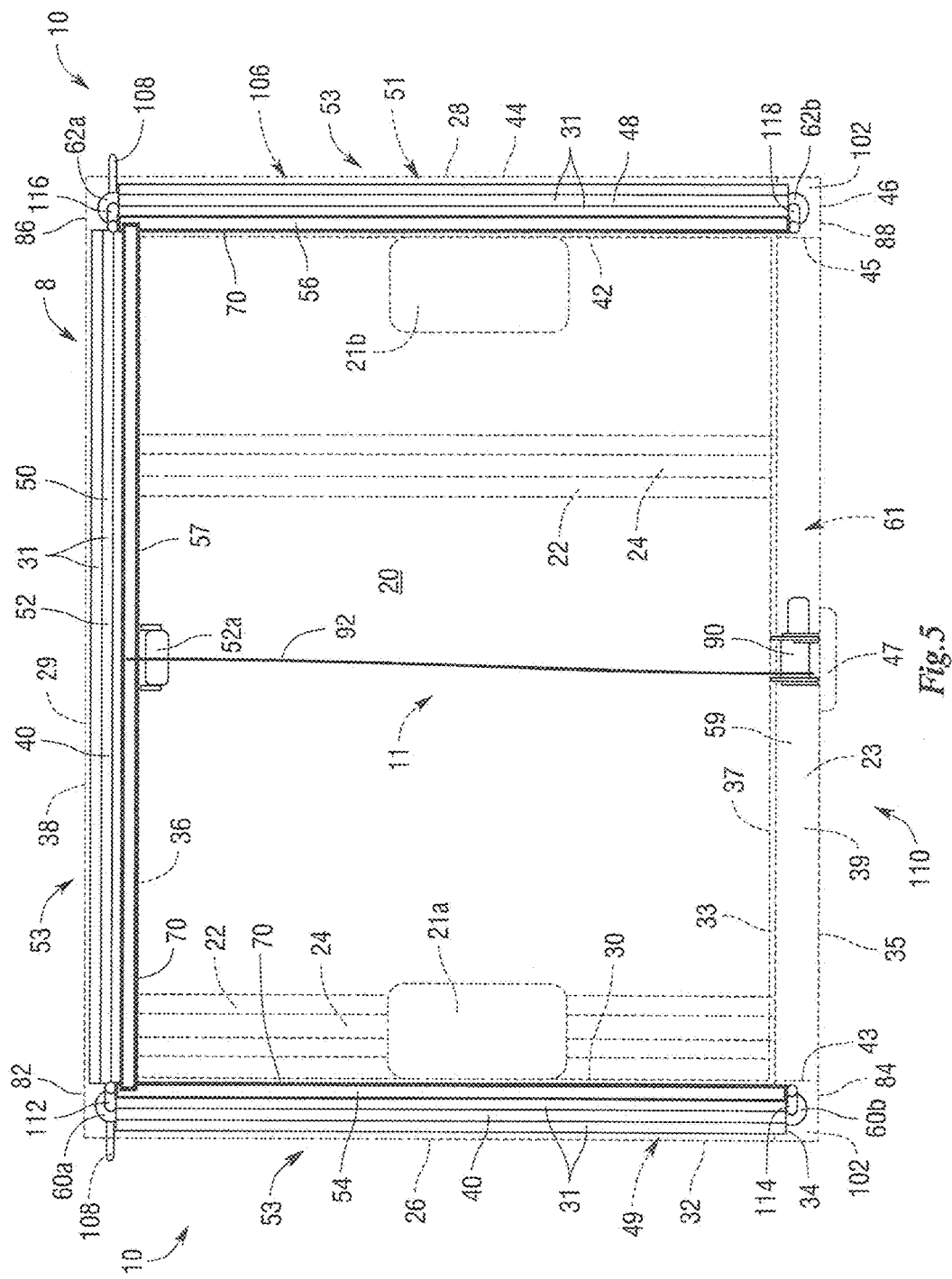

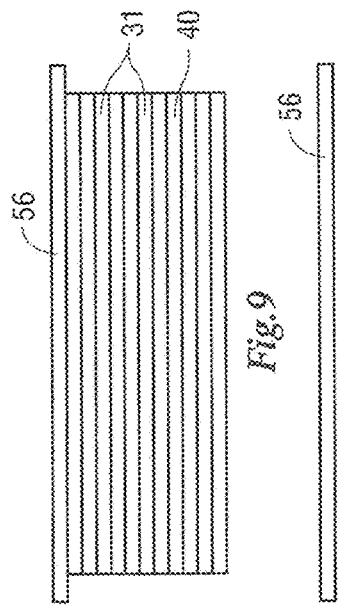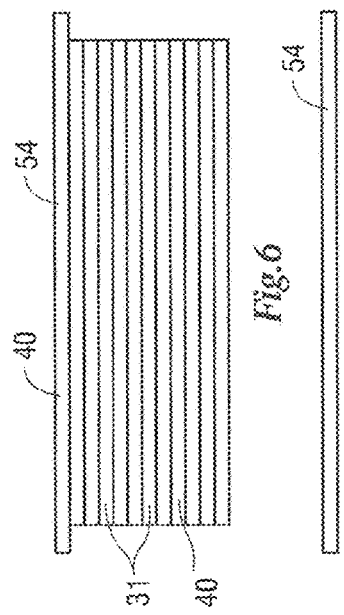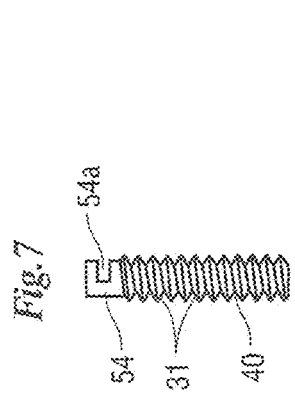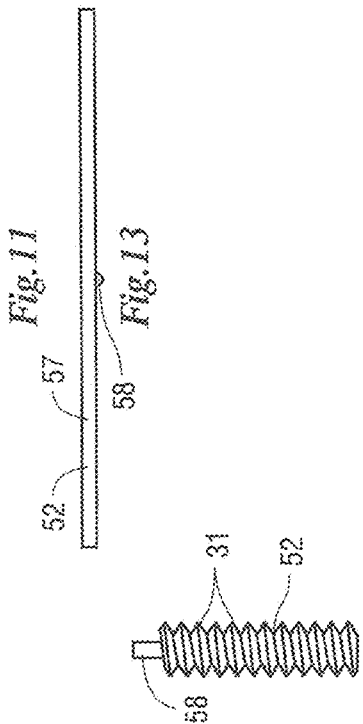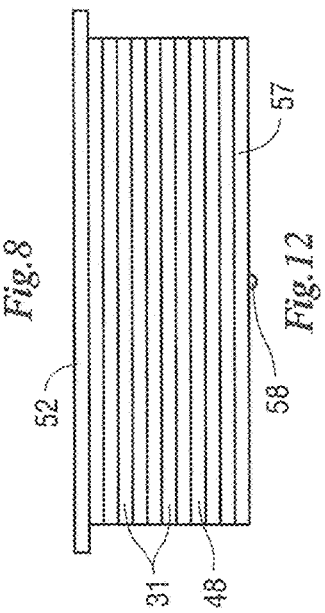

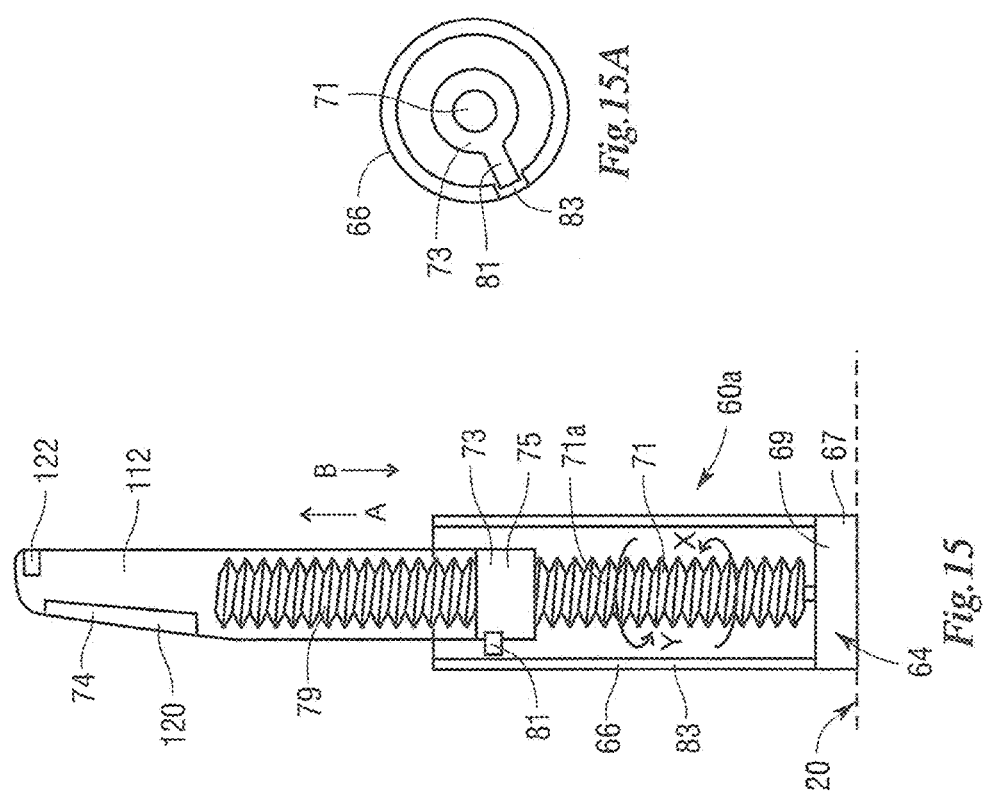

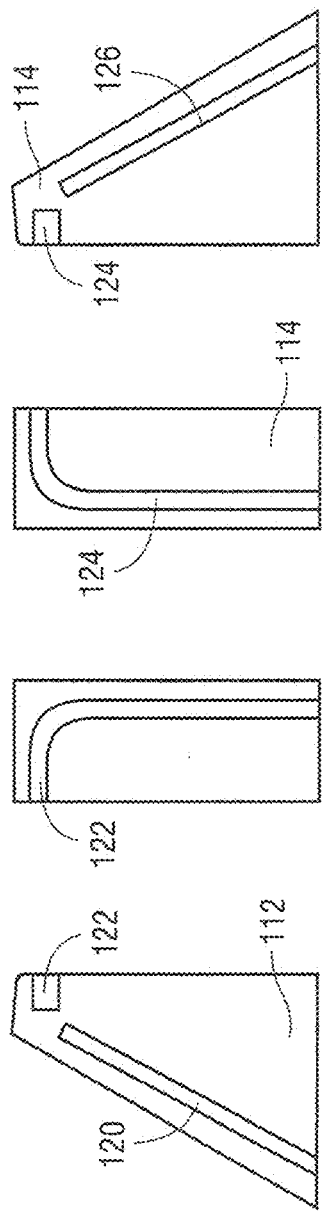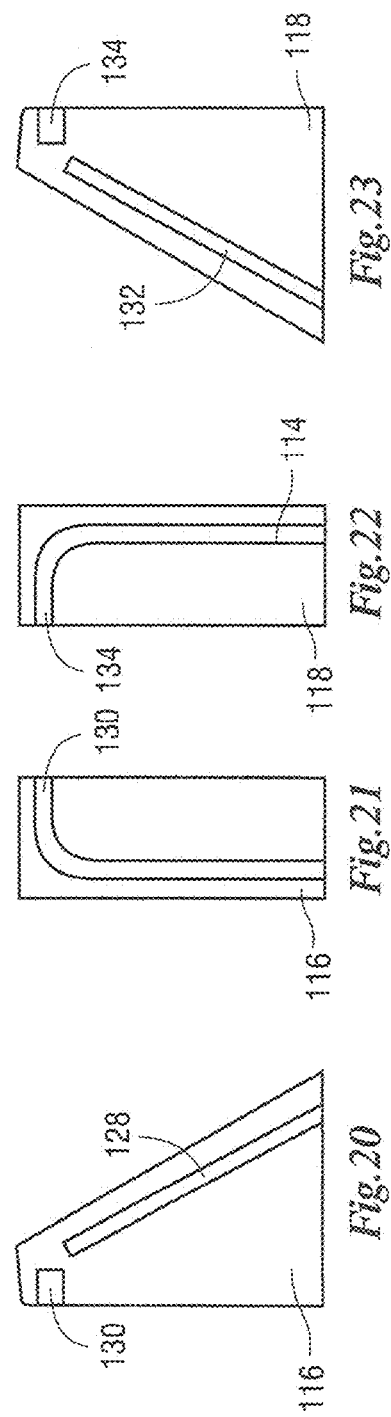

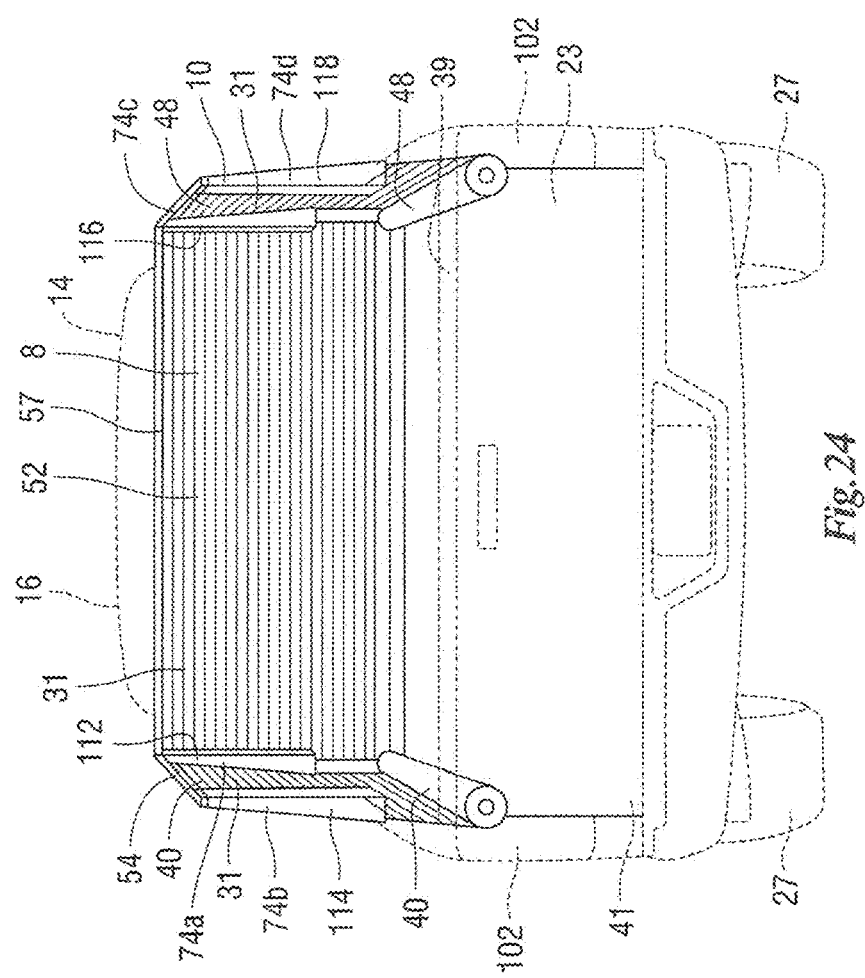

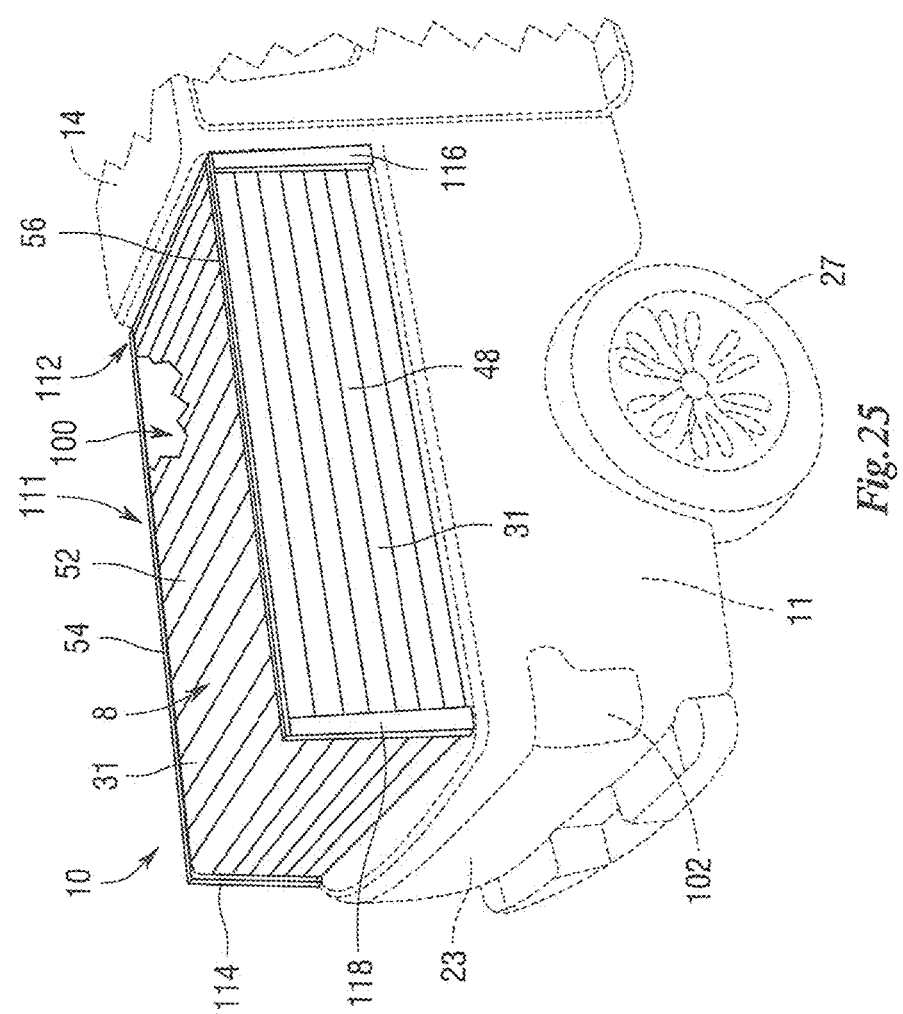

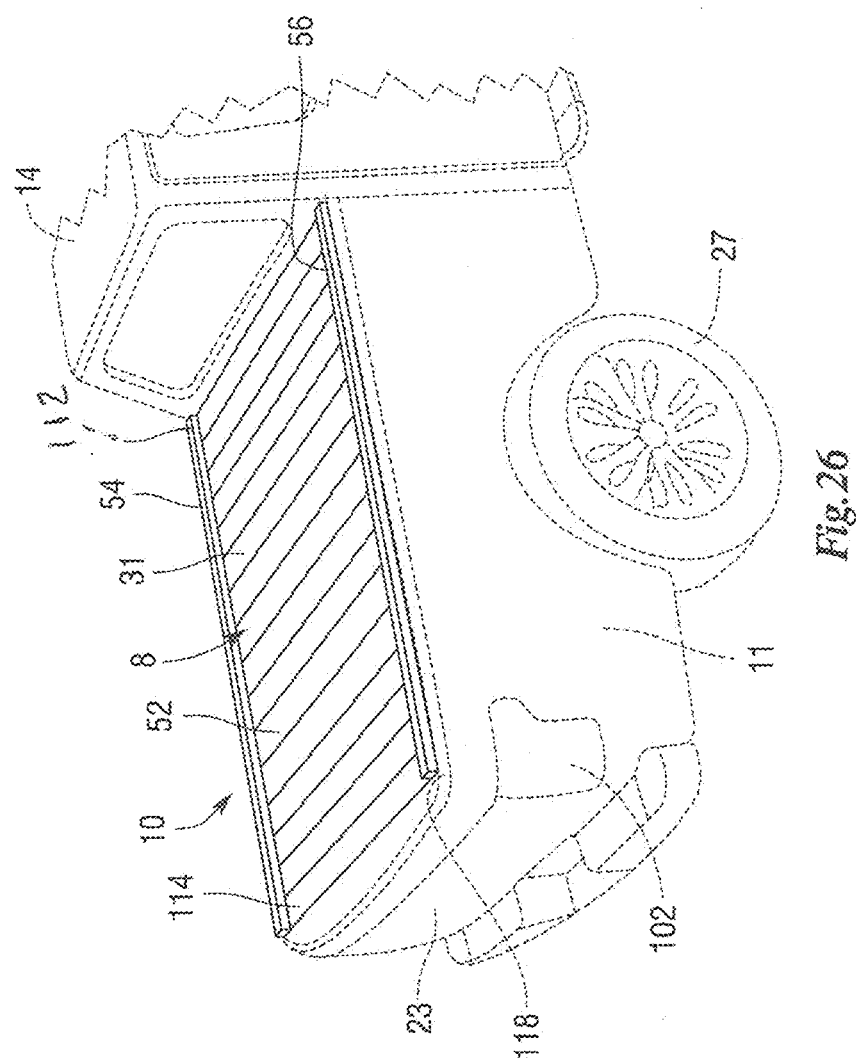

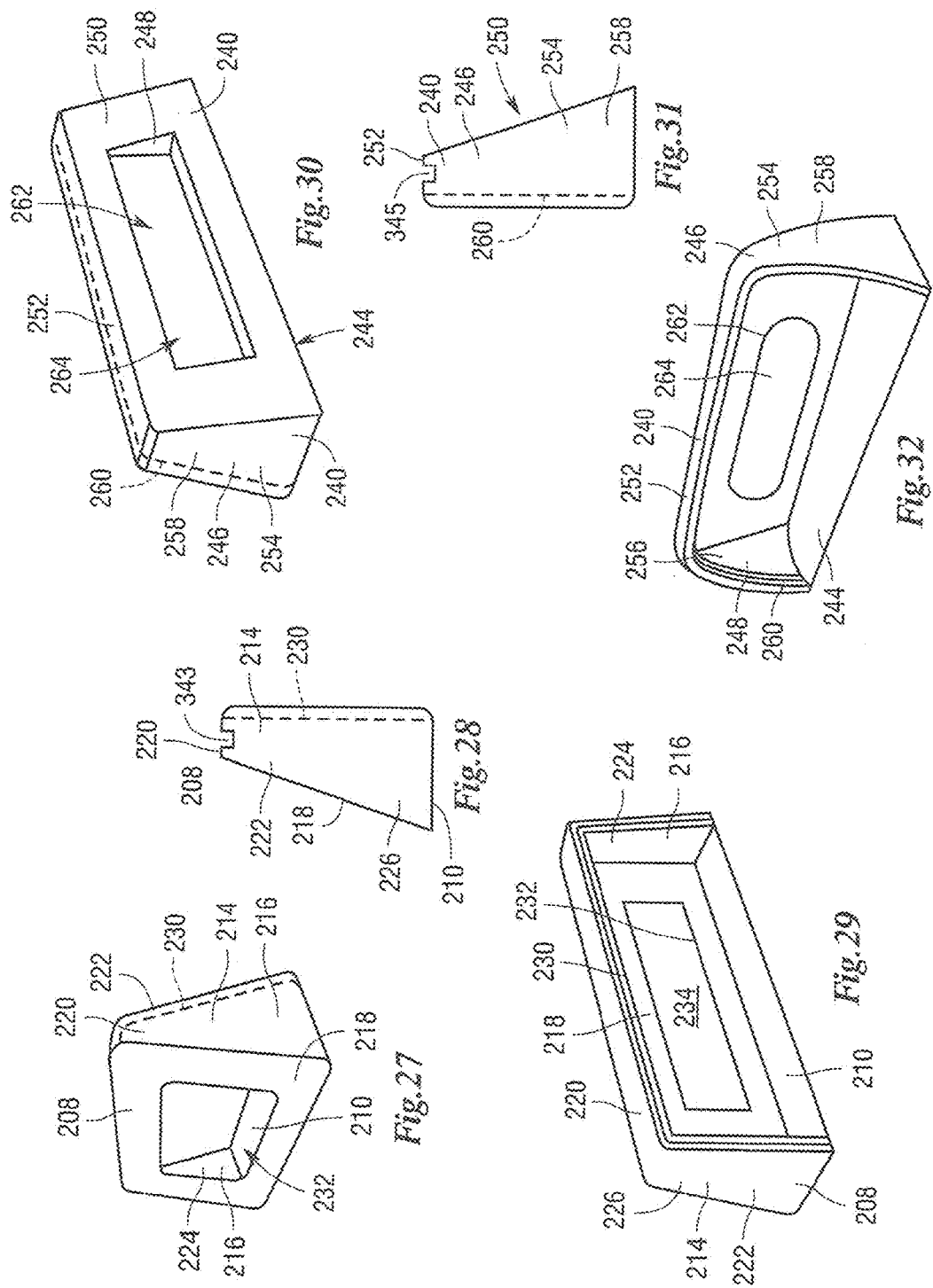

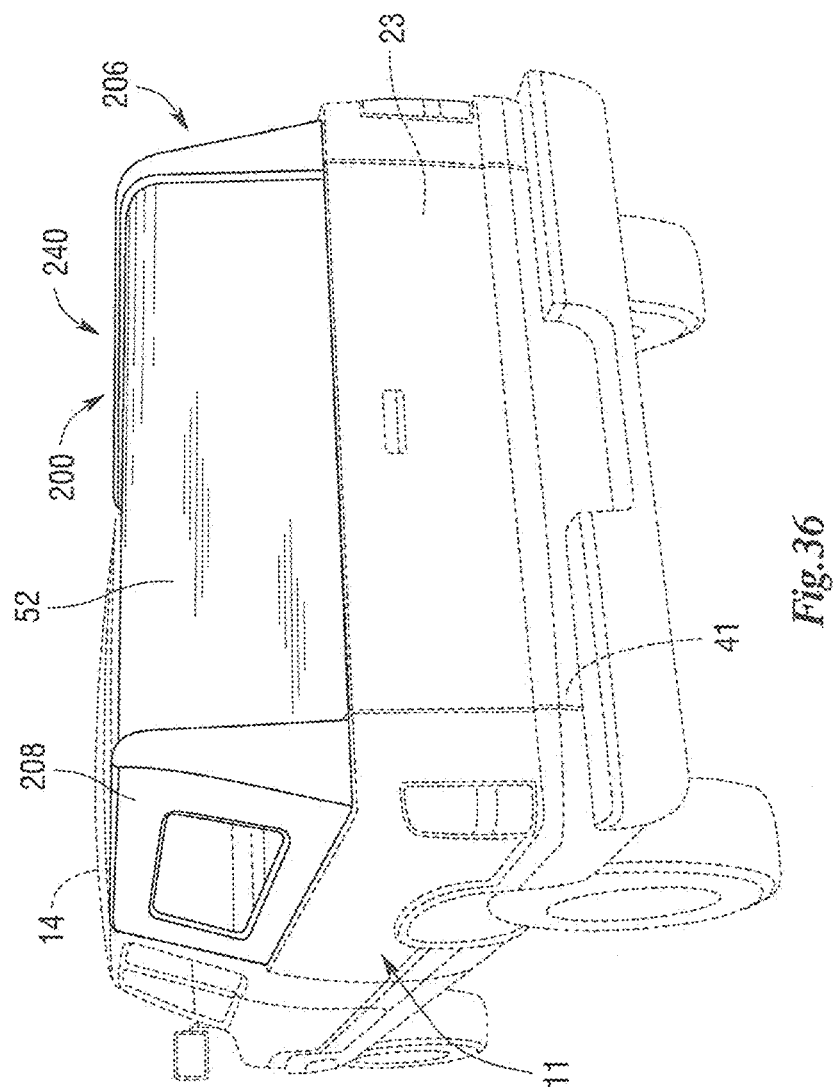

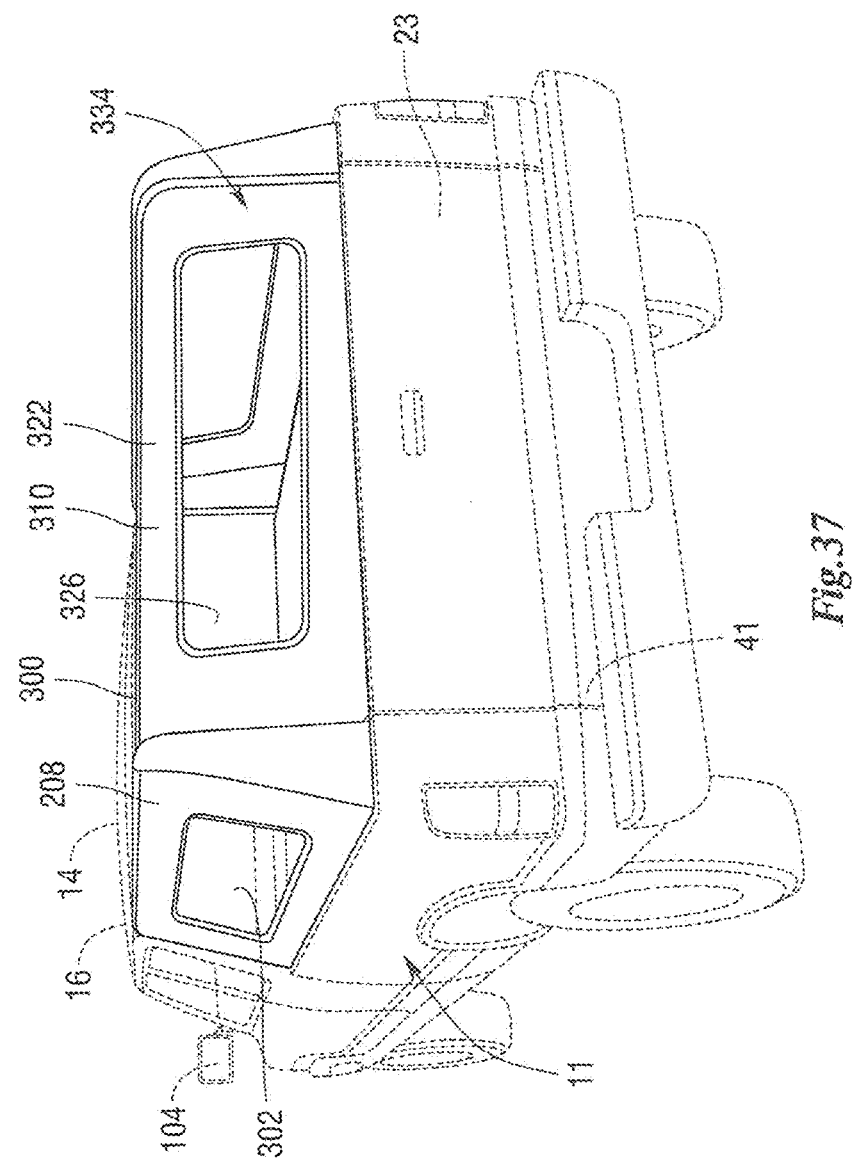

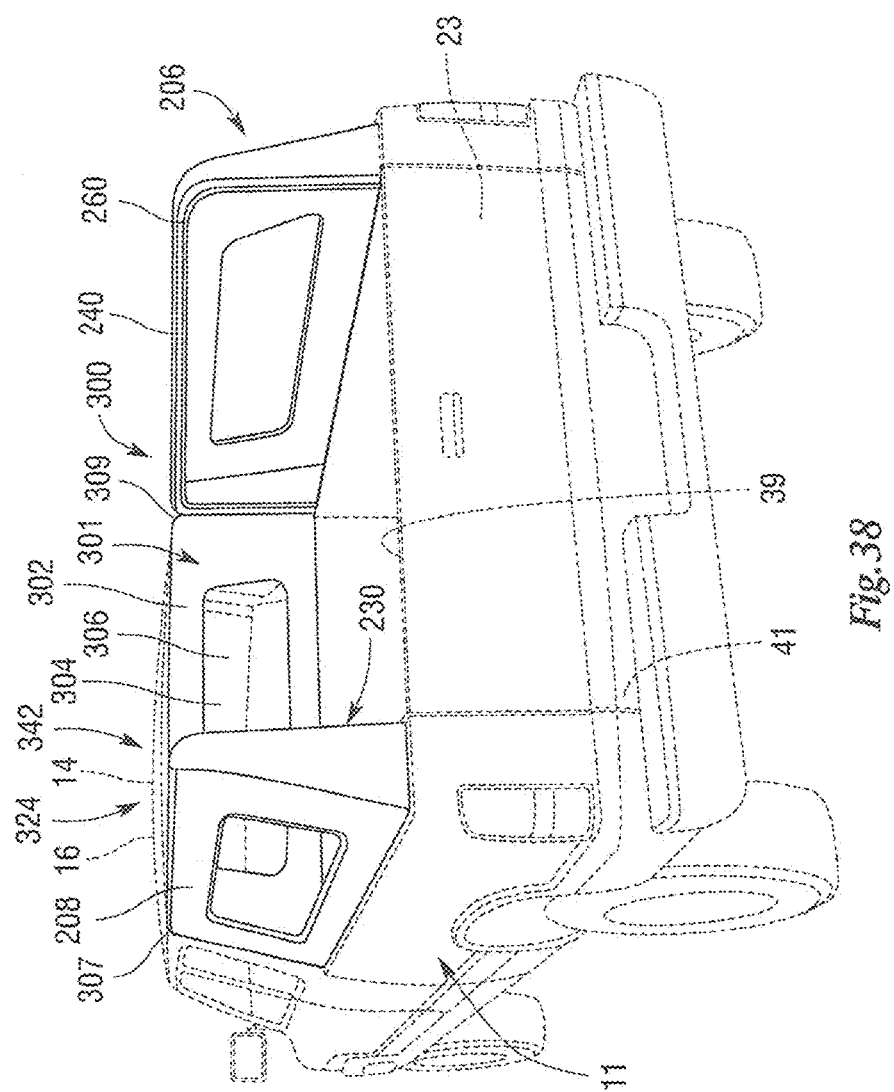

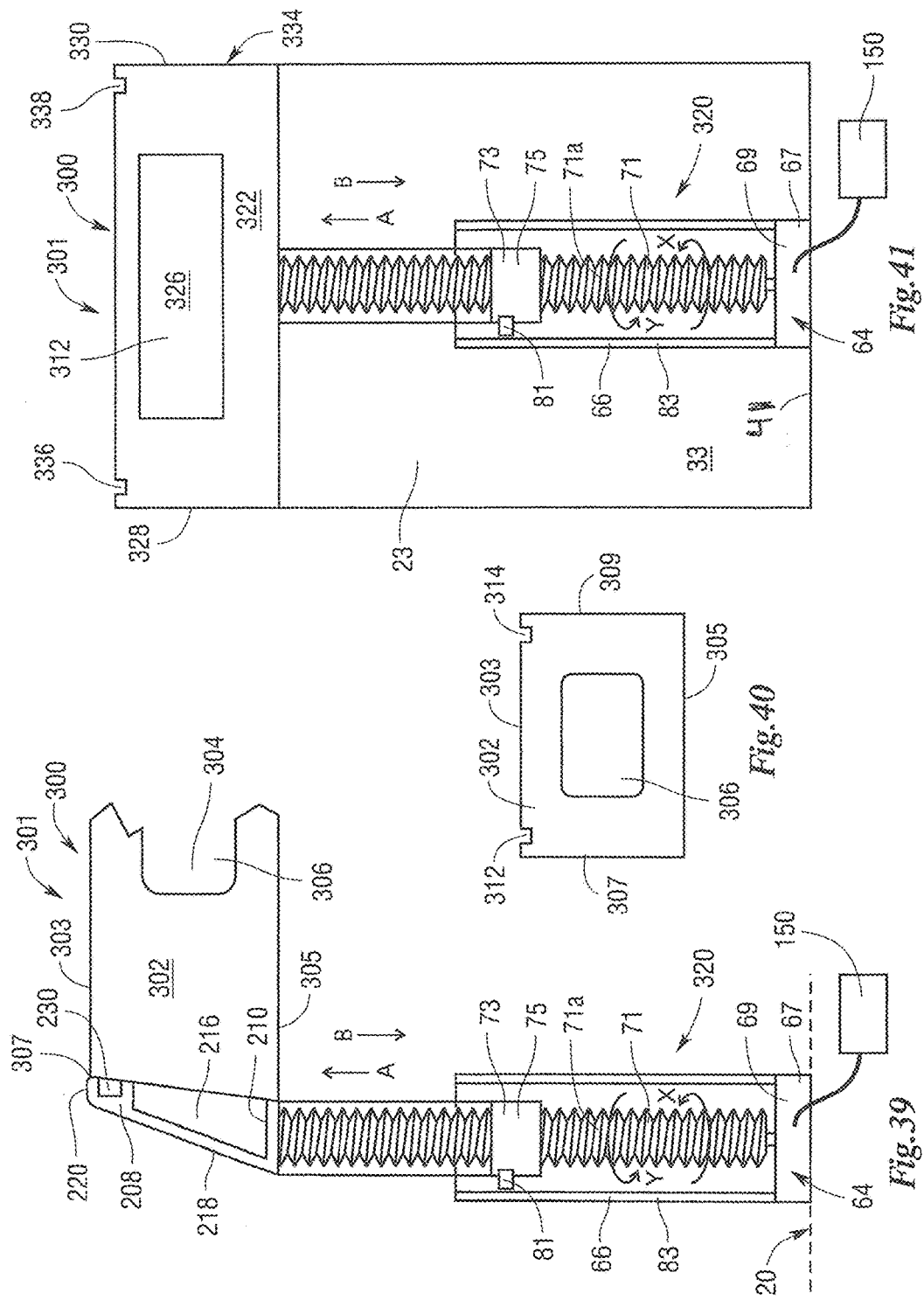

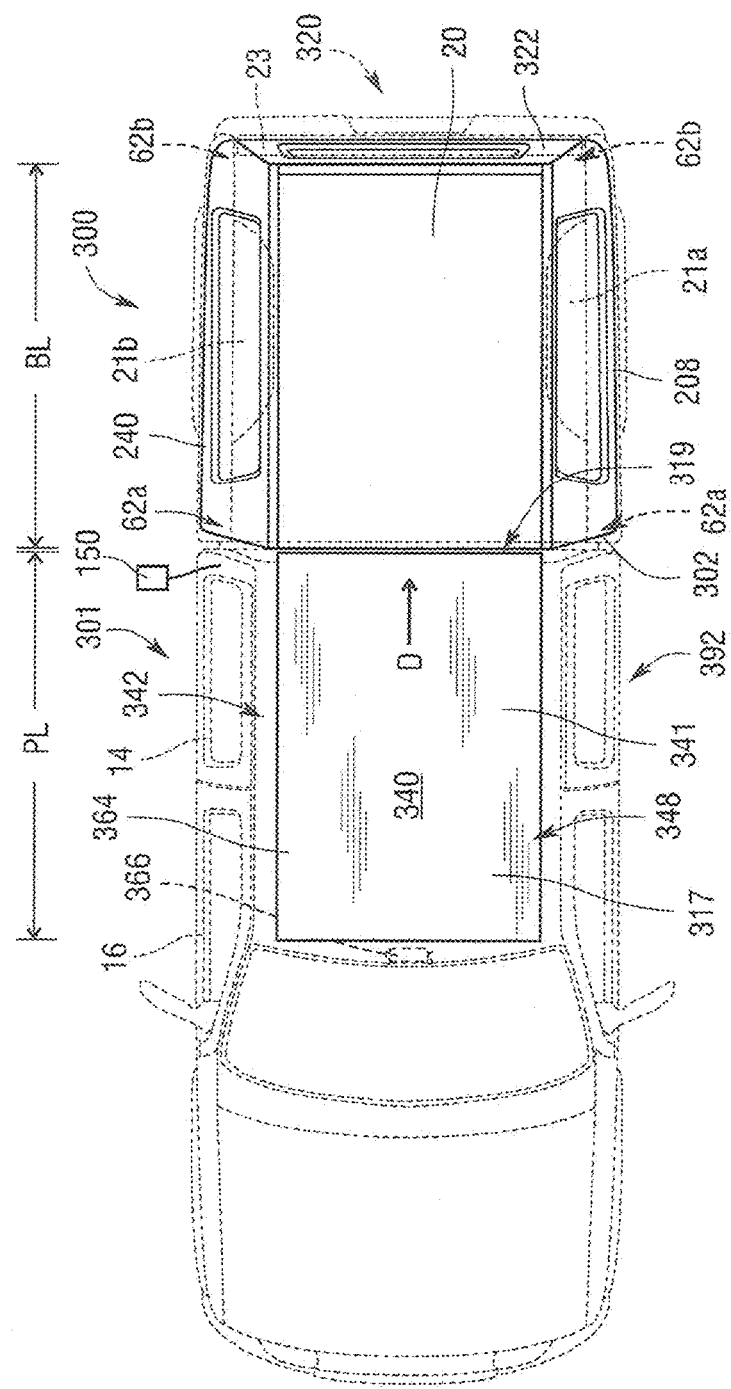

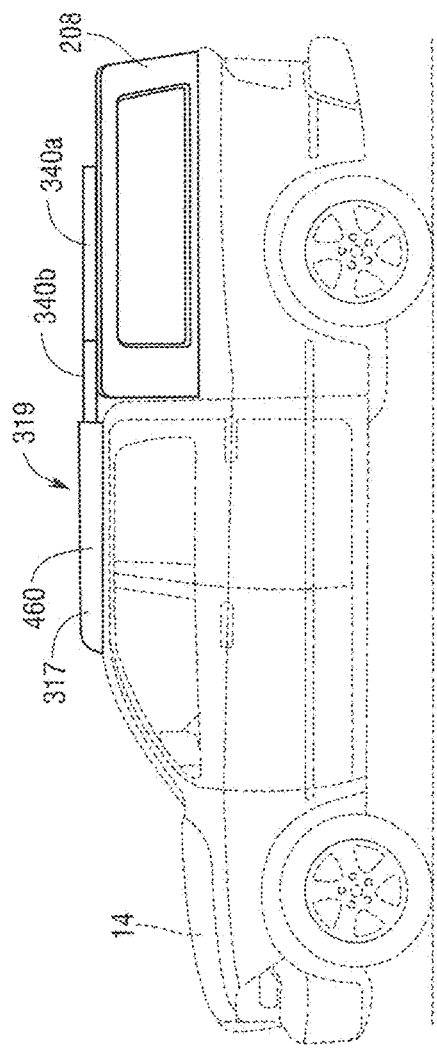
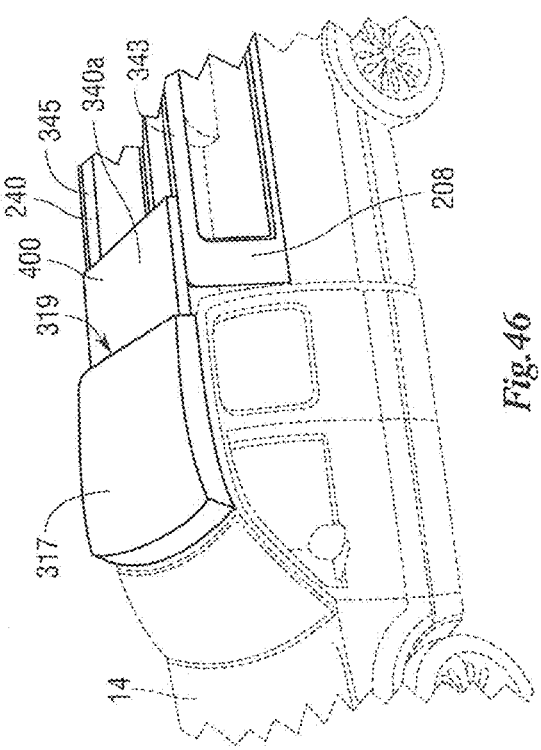
Fig. 45
Fig. 46

EXTENDABLE AND RETRACTABLE TRUCK CAP

CROSS REFERENCE TO RELATED APPLICATION

This application claims the benefit of U.S. Provisional Patent Application No. 62/340,391 filed on May 23, 2016 the entire disclose and contents of which are hereby incorporated herein by reference.

BACKGROUND

Pickup trucks are built such that they can support and thus transport a great number of different objects and materials. This is possible because a pickup truck has a frame that supports a cab and that supports a bed. The beds of pickup trucks can be used to haul almost anything that is capable of fitting within the confines of the bed.

Some pickup truck owners optionally place caps over the beds of their pickup trucks. This protects the items being transported from being damaged by the weather or from being stolen. However, when cap is installed on a pickup truck the versatility of the pickup truck is decreased. This is because truck beds are typically from six to eight feet long and the caps may be a few feet in high. When a cap is installed, the cap and bed define a confined tunnel-like structure. This then causes a plurality of problems in loading and unloading items from the bed and cargo area of the pickup truck. For example, when truck the is loaded with heavy items such as wood, lumber, bricks, sacks of feed or grain, or even a lighter items, it is difficult to load due to the cap. One must literally crawl under the cap to load the truck. The same problem appears when the time comes to unload cargo, which can be quite difficult due to the presence of the cap. One must literally crawl under the cap to unload the truck. Thus, while caps are well suited for protecting cargo from the elements, they create a problem for users when placing and retrieving items that are stored under the cap.

Another problem associated with caps currently in use is that they are heavy and hard to remove and install. In addition, the extra weight of the cap decreases the overall load capacity of the pickup truck.

Another drawback associated with caps is that if heavy items are being hauled the user is not able to move these heavy items to the portion of the bed closest to the cab of the pickup truck. Thus, uneven loading of the truck occurs and the rear portion of the pickup truck becomes overloaded, and this in turn causes the front of the pickup truck to rise up. This can result in the pickup truck becoming unwieldy when driven and may cause the driver to lose control of the pickup truck and have an accident.

Thus, there is a need for a cap that eliminates these problems, that is easy to install, easy to use, that is inexpensive to fabricate and that can be adapted for use for virtually any pickup truck regardless of the make or model of the pickup truck.

SUMMARY

An extendable and retractable truck cap for use with a truck provided. The extendable and retractable truck cap has a cap assembly and has a bed assembly. The bed assembly includes a bed and opposed first and second bed sidewalls that extend from the bed and a tailgate. The first bed sidewall has inner and outer sidewall panels and the second bed sidewall has inner and outer sidewall panels, and the inner and outer sidewall panels of the first bed sidewall and the bed define a first sidewall recess and the inner and outer sidewall panels of the second bed sidewall define a second sidewall recess. A first roll-up sidewall is disposed in the first sidewall recess and second roll-up sidewall is disposed in the second sidewall recess. The bed assembly includes a bed cross wall that extends from the bed and the bed cross wall has inner and outer cross wall panels that define a cross wall recess. A roll-up cover wall is positioned in the cross wall recess. Together the first and second sidewall recesses and the cross wall recess define a cap assembly recess sized to receive the cap assembly therein.

The cap assembly further includes a first, second, third and fourth wall raising arms that are mounted on first, second, third and fourth extendable and retractable post assemblies. The first, second, third and fourth extendable and retractable post assemblies are mounted on the bed. The wall raising arms raise and lower the first and second roll-up sidewalls and the roll-up cover wall that is pulled over the bed such that the bed is protected from the elements.

In another embodiment there is an extendable and retractable panel cap and in this embodiment the first and second roll-up walls are replaced with first and second cap panels and the roll-up cover wall is slid over the first and second cap panels. The first cap panel is mounted on the first and second extendable and retractable post assemblies, and the second cap panel is mounted on the third and fourth extendable and retractable post assemblies.

In another embodiment there is an extendable and retractable cab deployable panel cap that has the first and second cap panels and a cab panel. In addition, there is a tailgate panel and an end panel. A tailgate extendable and retractable post assembly is mounted in the tailgate and it raises and lowers the tailgate panel, and the end panel is connected to and moves with the first and second cap panels. The roll-up cover wall is replaced with a cab panel that is supported on a cap of the pickup truck. The cab panel can be slid on and off the pickup truck cab such that it is supported on the first and second cap panels.

Thus, extendable and retractable truck cap, the extendable and retractable panel cap, and the extendable and retractable cab deployable panel cap allow the user to gain rapid access to the bed of the pickup truck for both loading and unloading purposes. This thus eliminates some the problems associated with the caps currently in use. In addition, a controller is provided to control the above-mentioned extension and retraction processes, and to control the extendable and retractable post assemblies. Thus, the panel caps described herein may be used by virtually anyone.

In addition, the roll-up cover wall cab be controllably extended and retracted. Thus, the roll-up cover wall is capable of serving as a hatch so that the user can roll-up a portion of the roll-up cover wall to gain access to the bed of the pickup truck. In other words, the entire roll-up cover wall does not need to be rolled up in order to gain access to the bed.

BRIEF DESCRIPTION OF THE DRAWING FIGURES

FIG. 5 is a top view of the extendable and retractable truck cap truck cap wherein the first and a second roll-up sidewalls and a roll-up cover wall are all in retracted positions and the cab is not shown.

FIG. 6 is front view of the first roll-up sidewall.

FIG. 7 is a top view of the first roll-up sidewall.

FIG. 8 is a side view of the first roll-up sidewall.

FIG. 9 is front view of the second roll-up sidewall.

FIG. 10 is a top view of the second roll-up sidewall

FIG. 11 is a side view of the second roll-up sidewall.

FIG. 12 is a front view of a roll-up cover wall.

FIG. 13 is a top view of the roll-up cover wall.

FIG. 14 is a side view of the roll-up cover wall.

FIG. 15 a sectional view of a first extendable and retractable post assembly having a first wall raising arm mounted thereon.

FIG. 15a is a top view of the first extendable and retractable post assembly when the first wall raising arm is absent.

FIG. 16 is a front view of a first wall raising arm.

FIG. 17 is a right side view of the first wall raising arm.

FIG. 18 is a right side view of a second wall raising arm.

FIG. 19 is a rear view of the second wall raising arm.

FIG. 20 is a front view of a third wall raising arm.

FIG. 21 is a left side view of the third wall raising arm.

FIG. 22 is a left side view of a fourth wall raising arm.

FIG. 23 is a rear view of the fourth wall raising arm.

FIG. 24 is a rear view of the pickup truck showing the first, second, third and fourth wall raising arms when extended.

FIG. 25 is a perspective view of the pickup truck when the cap assembly is in the cap assembly extended position.

FIG. 26 is a perspective view of the pickup truck when the cap assembly is in a cap assembly retracted position and the roll-up cover wall drawn over the bed.

FIG. 27 is a front perspective view of a first cap panel for use in a pickup truck having an extendable and retractable panel cap and the first panel cap is part of a panel cap assembly.

FIG. 28 is an end view of the first cap panel.

FIG. 29 is rear perspective view of the first cap panel.

FIG. 30 is a front perspective view of a second cap panel.

FIG. 31 is an end view of the second cap panel.

FIG. 32 is rear perspective view of the second cap panel.

Figure 32A:
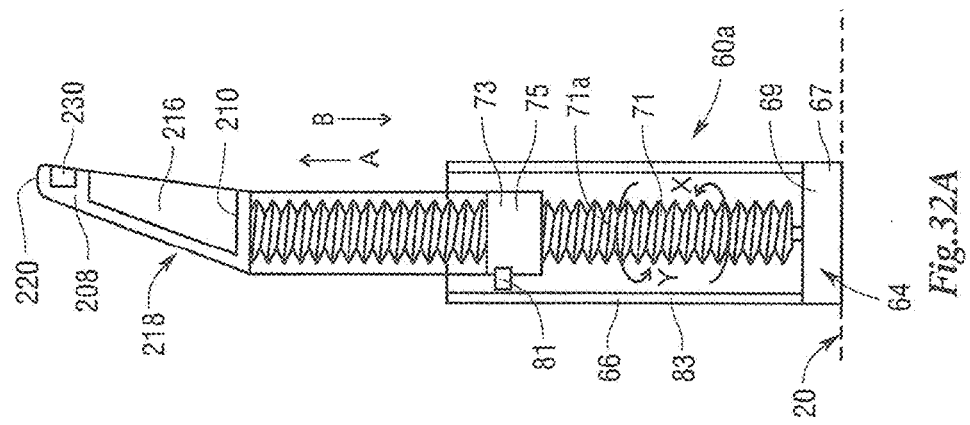

FIG. 32A is a sectional view showing the first cap panel mounted on the first extendable retractable post assembly.

FIGS. 33-36 show the pickup truck having the extendable and retractable panel cap assembly as the panel cap assembly is moved from a panel cap assembly retracted position to a panel cap assembly extended position.

FIG. 37 is a rear view of a pickup truck having a cab deployable panel cap.

FIG. 38 is rear view of a pickup truck having the cab deployable panel cap.

FIG. 39 is a sectional view of an end panel supported on the first a first extendable and retractable post FIG. 40 is a front view of the end panel.

FIG. 41 is a sectional view of a tailgate extendable and retractable post assembly supporting a tailgate panel.

FIG. 42 is a top view of the pickup truck having the cab deployable panel cap when a cab panel is retracted and supported on the cab of the pickup truck.

Figure 43:
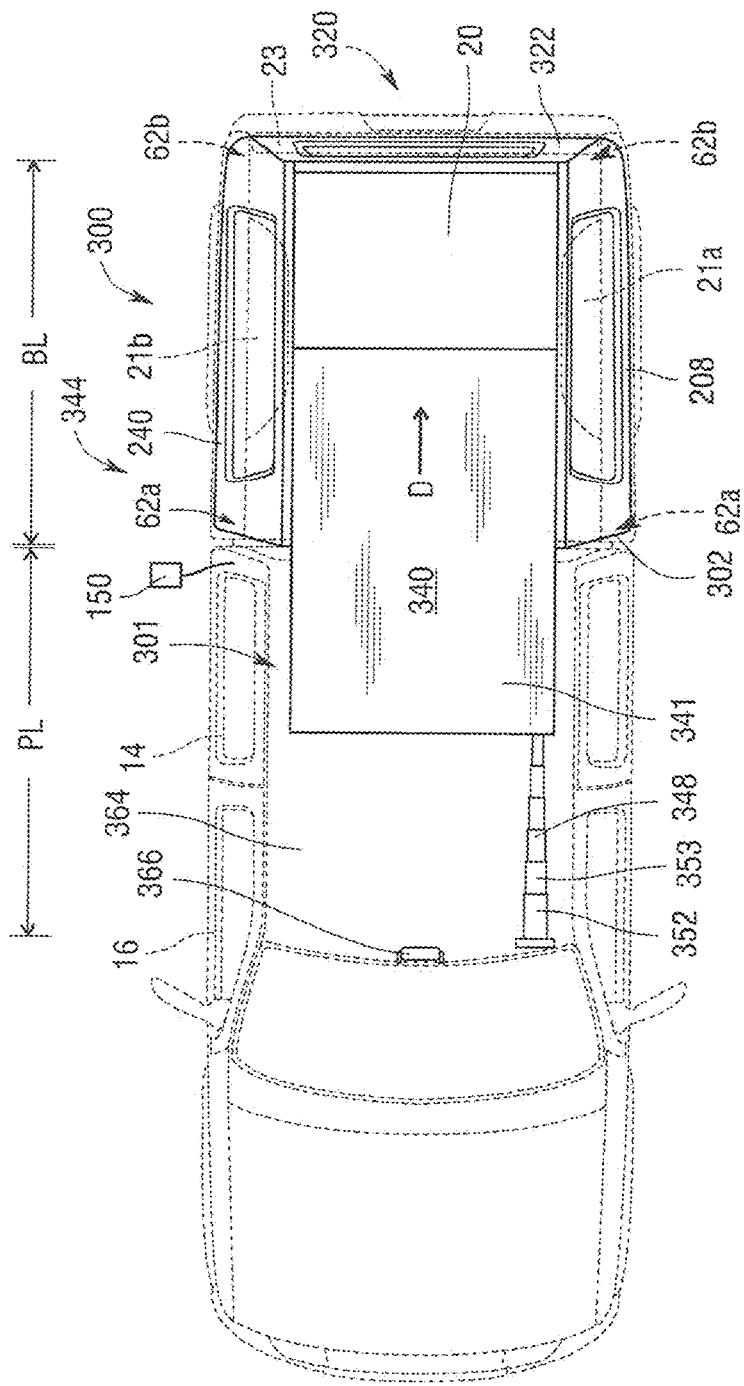

FIG. 43 is a top plan view of the pickup truck as the cab panel is extended over a portion of the bed.

Figure 44:
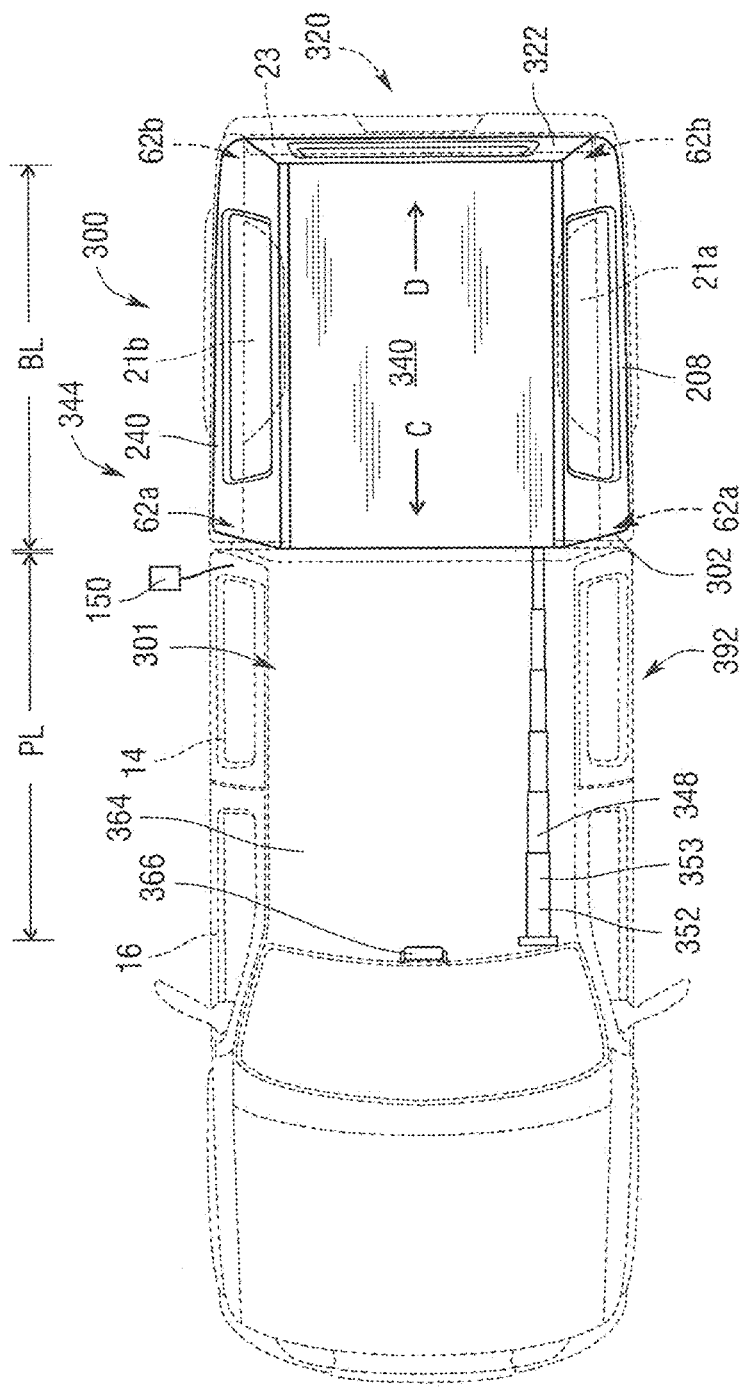

FIG. 44 is a top view of the pickup truck when the cab panel is fully extended over the bed.

FIG. 45 is a side view of the pickup truck wherein the extendable and retractable cab deployable panel cap 300 has a deployable panel cap assembly 400 having a plurality of cab panels 340.

FIG. 46 is a perspective view of the pickup truck shown in FIG. 45.

DESCRIPTION

Figure 1:
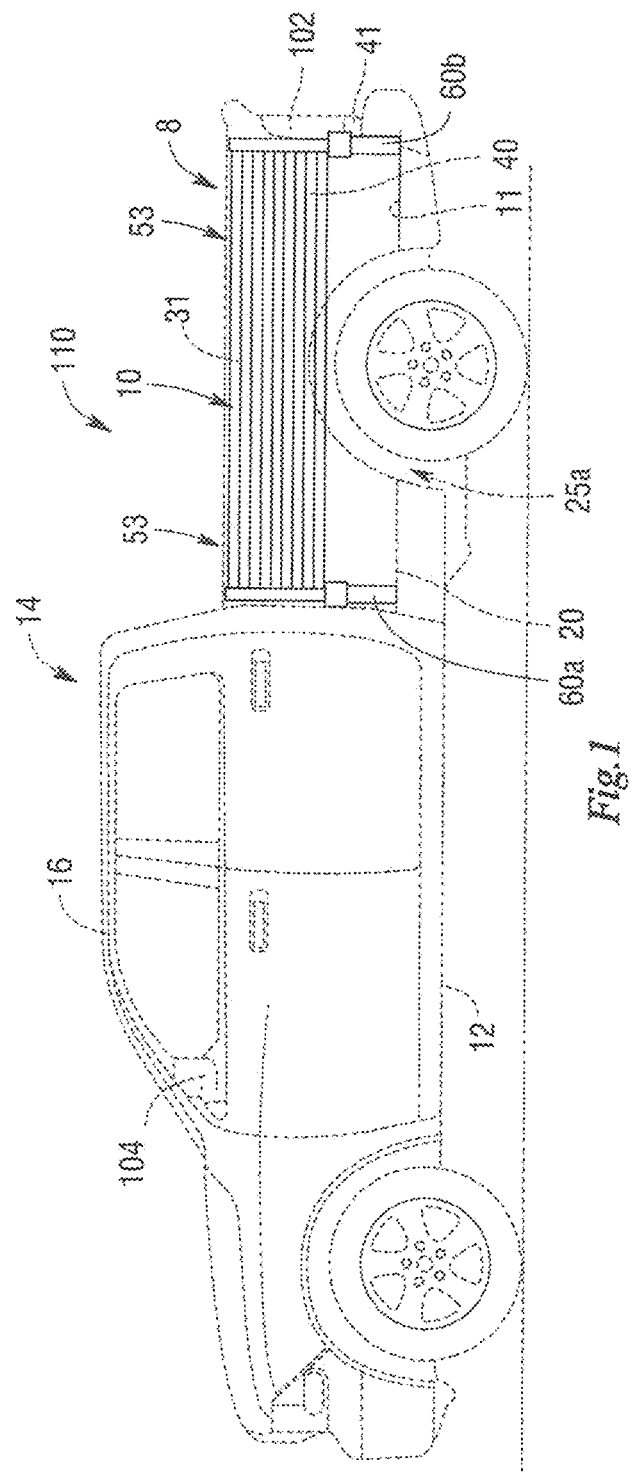
FIG. 1 is side view of a pickup truck having an extendable and retractable truck cap that includes a cap assembly and bed assembly cap assembly wherein the cap assembly is in a cap assembly retracted position.

FIG. 1 shows a side view of a pickup truck 14 having an extendable and retractable cap 8. The extendable and retractable cap 8 includes a cap assembly 10 and a bed assembly 11. The cap assembly 10 is in a cap assembly retracted position 110 in FIGS. 1 and 26. In FIG. 1 a first roll-up sidewall 40 is shown in dashed lines. The cap assembly 10 of the extendable and retractable truck cap 8 is supported on the bed assembly 11. The bed assembly 11 includes a bed 20 shown in FIGS. 4 and 5, and the bed 20 is supported on a frame 12 of the pickup truck 14. A cab 16 is provided and the cab is mounted on the frame 12, and the frame is supported on wheels 27, and the pickup truck 14 has taillights 102 and mirrors 104. It is pointed out that the extendable and retractable truck cap 8 is designed such that it can be installed on a pickup truck 14 at the point of manufacture of the pickup truck 14. Thus, the extendable retractable truck cap 8 may installed on virtually any make or model of pickup truck 14 at the point of manufacture by simple adjusting or varying the dimensions of the extendable and retractable truck cap 8. Optionally, a user may modify his or her vehicle by, for example, removing and or modifying the quarter panels and end panel and tailgate that were installed at the point of manufacture, followed by installing the extendable and retractable truck cap 8 on the bed 20 of his or her pickup truck 14. In another embodiment the user may install the extendable and retractable truck cap 8 directly on the bed 20 of his or her pickup truck. Thus, the extendable and retractable truck cap 8 can installed on newly made pickup trucks 14 at the at the point of manufacture, and with modifications or bolts can be installed on already existing pickup trucks 14 and other vehicles.

Figure 2:
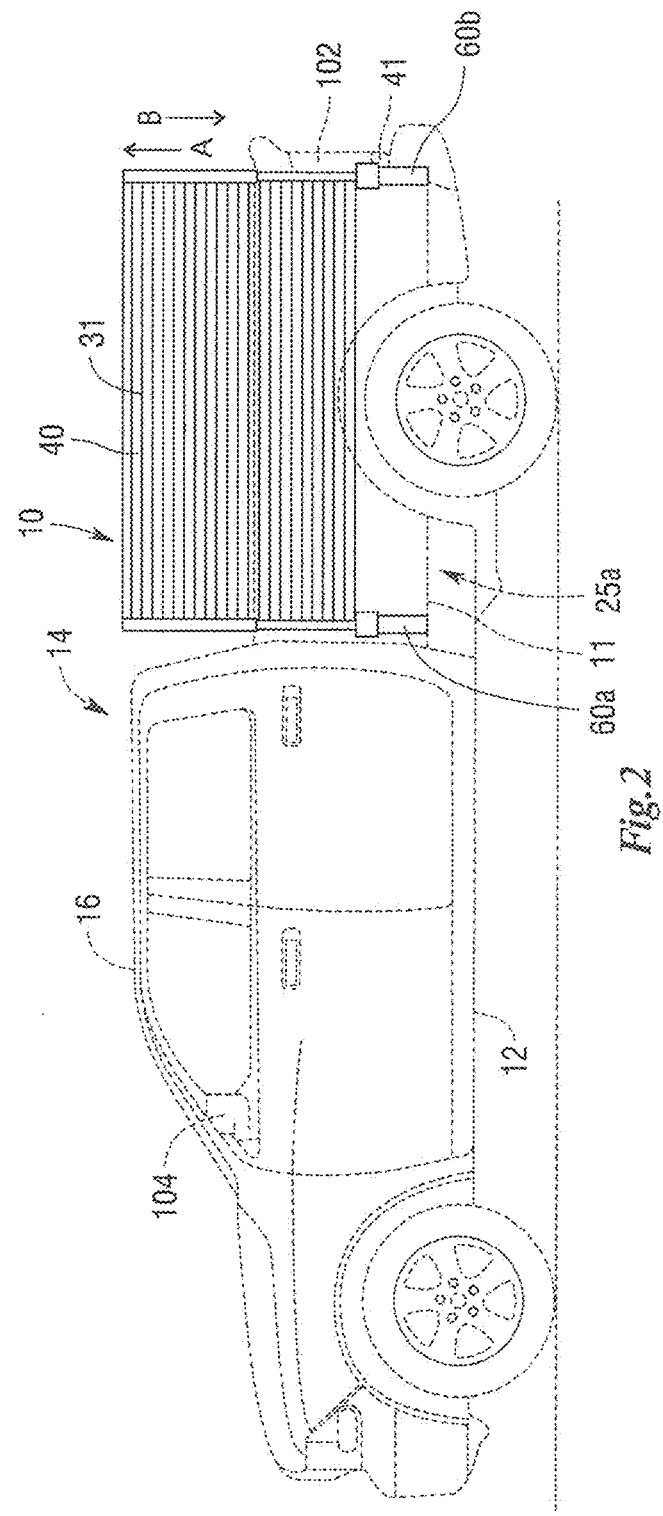
FIG. 2 is side view of the pickup truck having the extendable and retractable truck cap as a first roll-up sidewall thereof is being raised and the cap assembly is being extended.
Figure 3:
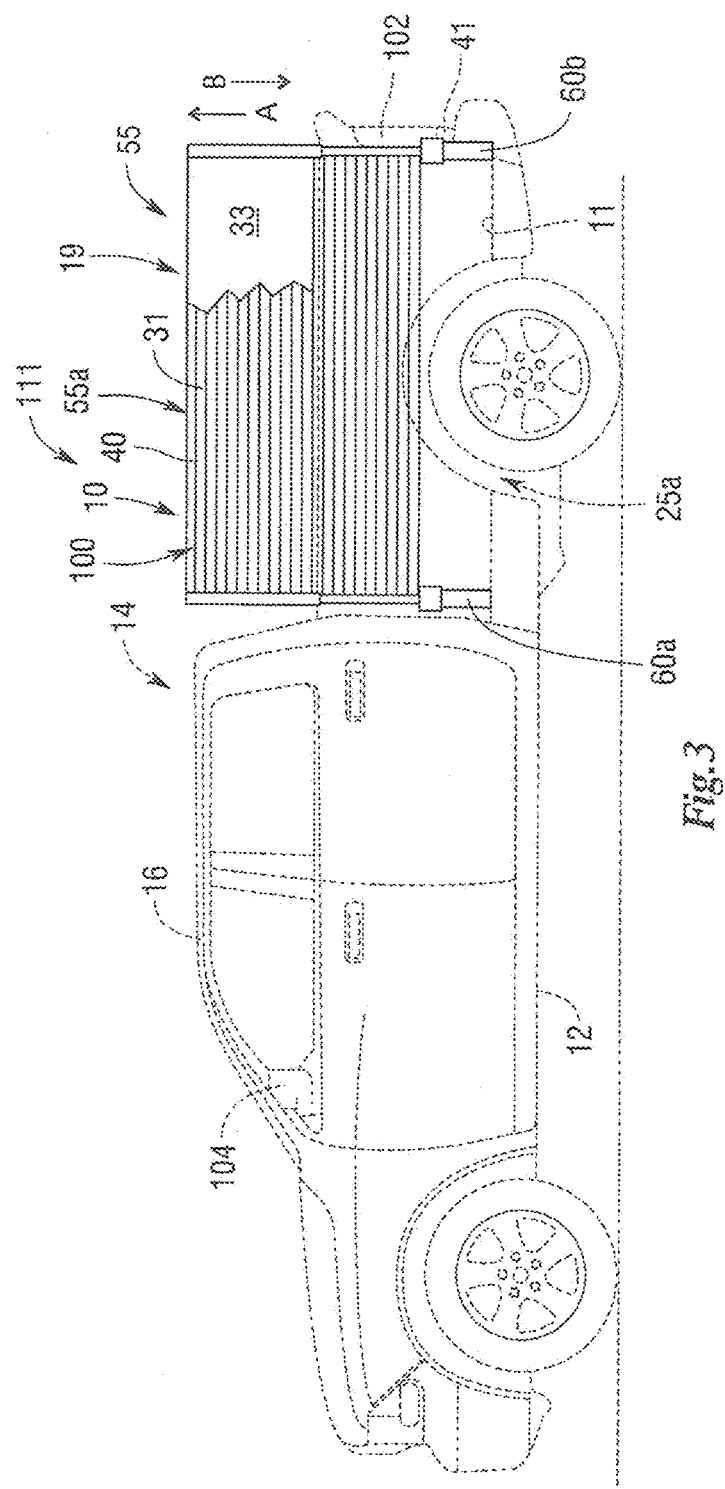
FIG. 3 is a side view of a pickup truck having the extendable and retractable truck cap wherein the first roll-up sidewall if fully raised and the cap assembly is in a cap assembly is in a cap assembly extended position.

FIG. 2 shows a side view of the pickup truck 14 wherein the first roll-up sidewall 40 has been partially extended. FIG. 3 is a side view of the pickup truck 14 wherein the first roll-up sidewall 40 is fully raised or extended. FIGS. 3, 24 and 25 show the extendable and retractable truck cap 8 when the cap assembly 10 is in a cap assembly extended position 111. In FIGS. 1 and 26, the cap assembly 10 is in a cap assembly retracted position 110 and a roll-up cover wall 52 extends over the bed 20.

Figure 4:
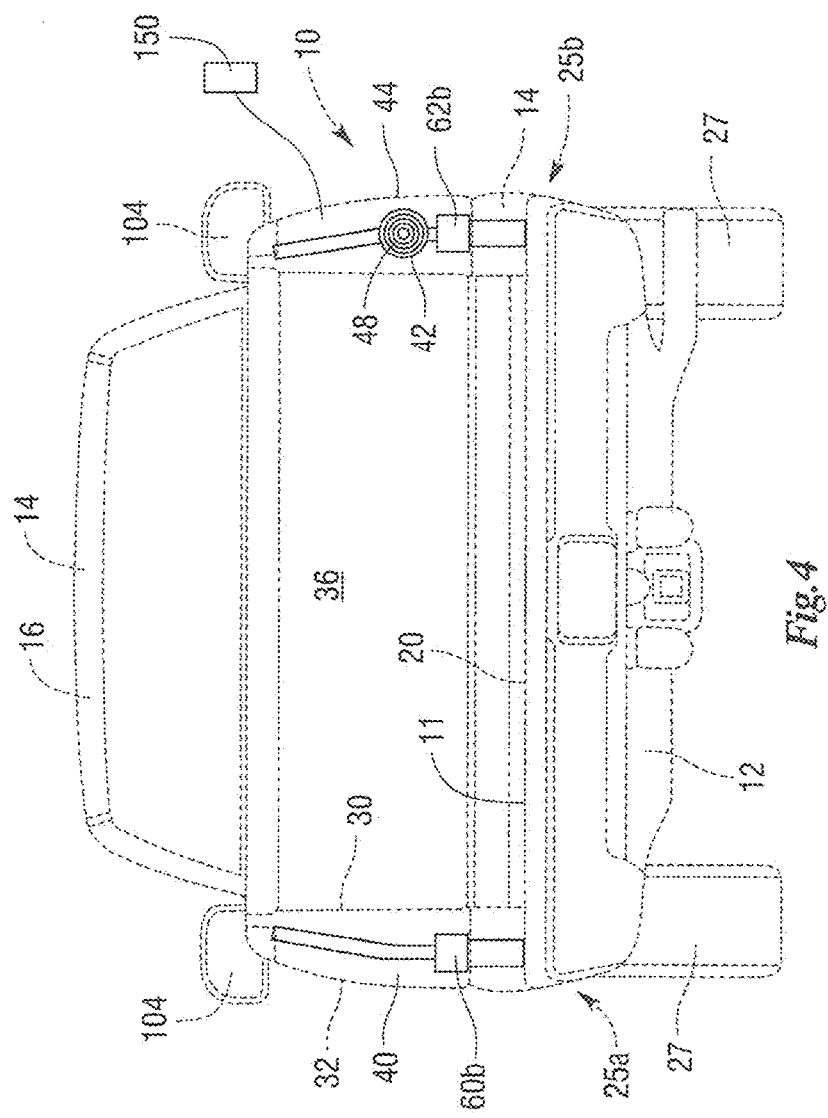
FIG. 4 is an end view of the pickup truck wherein the tailgate and taillights are absent such that second and fourth extendable and retractable post assemblies are exposed and supported on the bed assembly.

FIG. 4 is an end view of the pickup truck 14 wherein the tailgate 23 is absent and first and second end walls 34, 46 (shown in FIG. 5) are absent, such that second and fourth extendable and retractable post assemblies 60b, 62b are exposed. As shown, the second and fourth extendable and retractable post assemblies 60b, 62b are mounted on the bed 20 of the pickup truck 14. As will be described presently, the second and fourth extendable and retractable post assemblies 60b, 62b are utilized for raising and lowing the first roll-up sidewall 40 and a second roll-up sidewall 48.

Turning now to FIG. 5 there is shown a top view of the cap assembly 10 and the bed assembly 11 when in the cap assembly retracted position 110, and the cab 16 is not shown. The bed assembly 11 includes the previously mentioned bed 20 for supporting loads and it may be embodied with grooves and ridges 22, 24 for additional structural support. The bed assembly 11 also includes opposed first and second wheel fenders 21a, 21b that extend from the bed 20 and face one another. The first wheel fender 21a defines a first wheel well 25a and the second wheel fender 21b defines a second wheel well 25b (shown in FIG. 4) that are sized to accommodate the wheel 27. The bed assembly 11 also includes the tailgate 23 that is pivotally connected to the bed 20 and is in an upright closed position in FIG. 5.

As shown in FIG. 5, the tailgate 23 has inner and an outer tailgate sides 33, 35 that face one another and opposed lift and pivot end walls 39, 41 (FIGS. 1-3, 5 and 35) that face one another, and opposed first and second tailgate edge walls 43, 45 that face one another. The tailgate 23 also has a handle 47 such that the tailgate 23 can be opened and securely closed. The tailgate 23 inner and outer tailgate sides 33, 35 extend from the pivot end wall 41. The construction and use of tailgate handles for opening and closing tailgates is well known to those having ordinary skill in the art and is therefore not described in greater detail herein.

As shown in FIG. 5, as previously mentioned, the bed assembly 11 includes the bed 20 and also includes opposed first and second bed sidewalls 26, 28 that face one another and extend from the bed 20. The bed assembly 11 also includes a cross wall 29, and the cross wall 29 extends from the bed 20. The bed 20 also has a bed tailgate end 37, and the tailgate 23 is pivotally connected to the bed 20 at the bed tailgate end 37.

The cross wall 29 has inner and outer cross wall panels 36, 38 and the cross wall 29 extends from the first bed sidewall 26 to the second bed sidewall 28 as shown in FIG. 5. The inner and outer cross walls panels 36, 38 extend from the bed 20 and together they define a cross wall recess 50, and a roll-up cover wall 52 is positioned in the cross wall recess 50. The roll-up cover wall 52 is capable of being extended over the bed 20 as will be described presently. The roll-up cover wall 52 serves or functions as a roof.

The first bed sidewall 26 of the bed assembly 11 has inner and outer sidewall panels 30, 32 that extend from the bed 20 and both meet with a first end wall 34. The outer sidewall panel 32 meets with the outer cross wall panel 38. The inner sidewall panel 30 meets with the inner cross wall panel 36 as shown. The inner and outer sidewall panels 32, 38, the first end wall 34, and the bed 20 (on which the first bed sidewall 26 is supported) define a first sidewall recess 49 adapted to receive a first roll-up sidewall 40 therein as shown.

Similarly, the second bed sidewall 28 of the bed assembly 11 has inner and outer sidewall panels 42, 44 that extend from the bed 20 and both meet with a second end wall 46. The outer sidewall panel 44 of the second bed sidewall 28 meets with the outer cross wall panel 38 of the cross wall 29. The inner sidewall panel 42 of the second bed sidewall 28 meets with the inner cross wall panel 36 of the cross wall 29. The inner and outer walls sidewall panels 42, 44, the second end wall 46, the bed 20 (on which the second bed sidewall 28 is supported) define a second sidewall recess 51 adapted to receive a second roll-up sidewall 48 therein as shown.

Together, the bed 20 and the inner and outer cross wall panels 36, 38 of the bed cross wall 29, and the inner and outer sidewall panels 30, 32 of the first bed sidewall 26, and inner and outer sidewall panels 42, 44 of the second bed sidewall 28, and the first and second end walls 34, 46 define a cap assembly recess 106. Thus, the bed assembly 11 defines the cap assembly recess 106, and the cap assembly recess 106 has disposed therein the first and second roll-up sidewalls 40, 48, the roll-up cover wall 52, and first, second, third and fourth extendable and retractable post assemblies 60a, 60b, 62a, 62b. Thus, the cap assembly recess 106 is capable of receiving the cap assembly 10 therein.

It is pointed out that in the configuration of the cap assembly 10 shown in FIG. 5, the first roll-up sidewall 40, the second roll-up sidewall 48 and the roll-up cover wall 52 are each in a retracted positions commonly designated 53, and the cap assembly 10 is in the a cap assembly retracted position 110 shown in FIG. 1. FIG. 3 shows the cap assembly 10 in a cap assembly extended position 111. When the cap assembly 10 is in the a cap assembly retracted position none of the first, second roll-up sidewalls 40, 48 and roll-up cover wall 52 are visible when the pickup truck 14 is viewed at street level. In addition, the first roll-up sidewall 40, the second roll-up sidewall 48 and the roll-up cover wall 52 are made up of individual slats, commonly designated by reference number 31 throughout the drawing figures, that lock together in a gap and lap, tongue and groove, notch and groove, or other similar fashion. Interlocking slat roll-up walls are well known to those having ordinary skill in the art and are therefore not described in greater detail herein. The first roll-up sidewall 40, the second roll-up sidewall 48 and the roll-up cover wall 52 create an almost visibly seamless construction and provides for a hard surface that cannot be manipulated by wind, water, snow, or objects. The individual slats 31 that make up the first roll-up sidewall 40, and the second roll-up sidewall 48 and the roll-up cover wall 52 may be constructed with a hard type structural material such, as but not limited to, plastics, polymer, fiberglass, metals, wood, and combinations thereof and other suitable materials. In another preferred embodiment the first and second roll-up sidewalls 40, 48, and optionally the roll-up cover wall 52 are each made with a single piece of sheet material as indicated by reference number 33 in FIG. 3, for example a polycarbonate resin sheet of material, or a plastic sheet of material and the slats 31 are not utilized.

As shown in FIGS. 5, 15 and 15a cap assembly 10 further includes the first and second extendable and retractable post assemblies 60a, 60b, and third and fourth extendable and retractable post assemblies 62a, 62b, all of which are mounted on the bed 20. The first and second extendable and retractable post assemblies 60a, 60b are positioned between the inner and outer sidewall panels 30, 32 of the first bed sidewall 26, and the third and fourth second extendable and retractable post assemblies 62a, 62b are positioned between the inner and outer sidewall panels 42, 44 of the second bed sidewall 28. Mounted on the first extendable and retractable post assemblies 60a is a first wall raising arm 118, mounted on the second extendable and retractable post assembly 60b is a second wall raising arm 114, mounted on the third extendable and retractable post assembly 62a is a third wall raising arm, 116 and mounted on the fourth extendable and retractable post assembly 62b is a fourth wall raising arm 118 as shown in FIGS. 5, 15 and 24.

Reference is now made to FIG. 5-8. The first roll-up sidewall 40 is connected to a first guide bar 54, and the first guide bar 54 is mounted on and secured to the first and second wall raising arms 112, 114 that in turn are mounted on the first and second extendable and retractable post assemblies 60a, 60b, respectively. The first guide bar 54 defines a first cover receiving groove 54a. As shown in FIGS. 5 and 9-11 the second roll-up sidewall 48 is connected to a second guide bar 56, and the second guide bar 56 is mounted on and secured to the third and fourth wall raising arms 116, 118 that in turn are mounted on the third and fourth extendable and retractable post assemblies 62a, 62b. The second guide bar 56 defines a second cover receiving groove 56a. As shown in FIGS. 5 and 12-14, mounted on and secured to a roll-up cover wall 52 is a leading edge guide bar 57 and an engagement member 58 extends from the leading edge guide bar 57. The leading edge guide bar 57 is supported on the first and third wall raising arms 112, 116 such that as they are extended and retracted the leading edge guide bar 57 and the roll-up cover wall 52 move in unison therewith. Thus, when the first and third extendable and retractable post assemblies 60a, 60b are fully raised the first and third wall raising arms 112, 116 are fully raised and a portion of the roll-up cover wall 52 is raised, but the roll-up cover wall 52 does not yet fully extended over the bed 20 of the pickup truck 14 because it needs to be pulled over the bed 20. The first and second cover receiving grooves 54a, 56a are sized to receive the leading edge guide bar 57 and roll-up cover wall 52 therein, such that as the roll-up cover wall 52 is moved over the bed 20 (in either direction) it moves through the first and second cover receiving grooves 54a, 56a and is supported on the first guide bar 54 and the second guide bar 56.

As the first and second extendable and retractable post assemblies 60a, 60b are extended and retracted the first and second wall raising arms 112, 114 extend and retract and the first roll-up sidewall 40, thus causing it to move up and down and in the direction of the arrows designated A and B in FIGS. 2-3. In the same manner, as the third and fourth extendable and retractable post assemblies 62a, 62b extend and retract the third and fourth wall raising arms 116, 118, thus causing them to extend and retract and the second roll-up sidewall 48 that is moved in the direction of the arrows designated A and B in FIG. 4. In addition, as the first and third extendable and retractable post assemblies 60a, 62a extend and retract the first and third wall raising arms 112, 116 a portion of the roll-up cover wall 52 also extends and retracts. Thus, as the first, second, third and fourth extendable and retractable post assemblies 60a, 60b, 62a, 62b cause the first, second, third and fourth wall raising arms 112, 114, 116, 118 raise and lower the first and second roll-up sidewalls 40, 48, and a portion of the roll-up cover wall 52 are extended and retracted. FIG. 1 shows the first and second roll-up sidewalls 40, 48 and roll-up cover wall 52 in retracted positions 53, and FIGS. 3 and 24 shows the first and second roll-up sidewalls 40, 48 in extended positions 55, and a portion of the roll-up cover wall 52 extended.

FIG. 15 shows a sectional view of the first extendable and retractable post assembly 60a. The first extendable and retractable post assembly 60a is mounted on the bed 20 and has a housing 66. The first, second, third and fourth extendable and retractable post assemblies 60a, 60b, 62a, 62b are structurally identical. The first, second, third and fourth extendable and retractable post assemblies 60a, 60b, 62a, 62b have drive mechanisms commonly designated by reference number 64 for extending and retracting the first, second, third and fourth wall raising arms 112, 114, 116, 118.

In other embodiments wherein the first and second wall raising arms 112, 114 and third and fourth wall raising arms 116, 118 are structurally interconnected with one another, only the first extendable and retractable post assembly 60a its drive mechanism 64 may be used to simultaneously power the lifting and lowering of the retracting first, second, third and fourth wall raising arms 112, 114, 116, 118. In other embodiments only the first, and third extendable and retractable post assemblies 60a, 62a and two drive mechanisms 64 are required, for example one to power interconnected first and second wall raising arms 112, 114 and one to power interconnected third and fourth wall raising arms 116, 118. The interconnecting component may be a bar 70 or bars as shown in dashed line in FIG. 5.

As shown in FIG. 15, the first wall raising arm 112 is mounted on the first extendable and retractable post assembly 60a. The first extendable and retractable post assembly 60a has the drive mechanism 64 for raising and lowering the first wall raising arm 112. In one embodiment the drive mechanism 64 has an actuator 67 having an electric powered motor 69 that is operatively associated with a screw 71, and the screw has an external thread 71a. The actuator 67 converts electrical energy into torque that is delivered to the screw 71. There is a controller 150 operatively associated actuator 67 such the rotation the motor 69, and thus the rotation of the screw 71, can be controlled. The controller 150 may be wired to the motor or may control the motor 69 in a wireless manner. The controller 150 may also be disposed in the cab 16, or disposed elsewhere on the pickup truck 15. As shown in the FIG. 15 the screw 71 can be rotated clockwise (indicated by the arrow designated X) and counterclockwise (indicated by the arrow designated Y). The drive mechanism 64 also includes a carriage 73 having an internal thread 75 that is threaded to the screw 71. The first wall raising arm 112 is mounted on the carriage 75 and the first wall raising arm 112 has an internal arm thread 79 that is sized to receive the screw 71 and threaded to the screw 71. In addition, to prevent the first wall-raising arm 112 from rotating, as it is being raised and lowered, the carriage 73 has a locking arm 81 that extends from it, and the housing 66 defines an internal locking arm slot 83 that extends longitudinally along the housing 66. As shown in FIG. 15a, the locking arm 81 is fitted in the locking arm slot 83 such that as the screw 71 rotates the carriage 73 is moved up or down (arrows designated A and B in FIG. 15), while the carriage 73 and the first wall raising arm 112 (not shown in FIG. 15a for the sake of clarity) mounted thereon do not rotate, but rather can only move up or down. The construction and operation of actuators and controllers and controlling actuators in a wireless manner is well known to those having ordinary skill in the art and are therefore not described herein in greater detail. The second wall, third and fourth wall raising arms 114, 116, 118 mounted on the second, third and fourth extendable and retractable post assemblies 60b, 62a, 62b are raised and lowered in a substantially identical manner. It is pointed out that the controller 150 may be used in connection with all of the embodiments described herein.

In other embodiments the drive mechanism 64 is in the form of a telescopic support rod that supports the first wall-raising arm 112, and the telescopic support rod is moved with hydraulic or pneumatic pressure. In other embodiments the drive mechanism 64 may be electro-hydraulic, a cable and pulley, motors, a channel with sprocket and tooth assembly, and all of these driver mechanisms 64 and their use and construction are well known to those having ordinary skill in the art and are therefore not described in greater detail herein. The housing 66 may be constructed of metal, plastics, polymers, fiberglass, metals, and other suitable materials without limitation.

As shown in FIGS. 16, 17 and 24, the first wall-raising arm 112 defines a first arm roll-up wall slot 120 and a first arm cover wall slot 122. As shown in FIGS. 18 and 19 the second wall raising arm 114 defines a second arm roll-up wall slot 124 and a second arm cover wall slot 126. The first and second arm roll-up slots 120, 124 are sized to receive the first roll-up wall 40 therein, and the first and second arm cover wall slots 122, 126 are sized to receive the roll-up cover wall 52 therein. As shown in FIG. 15, the first wall-raising arm 112 that is mounted on the carriage 73 has a tapered portion 74a and defines the first arm cover wall slot 122. The second, third, and fourth wall raising arms 114, 116, 118 likewise have tapered portions 74b, 74c, and 74d as shown in FIG. 24.

Similarly, the third wall raising arm 116 defines a third arm roll-up wall slot 128 and a third arm cover wall slot 130 as shown in FIGS. 20 and 21. As shown in FIGS. 22 and 23 the fourth wall raising arm 118 defines a fourth arm roll-up wall slot 132 and a fourth arm cover wall slot 134. The third and fourth arm roll-up wall slots 128, 130 are sized to receive the second roll-up wall 48, and the third and fourth arm cover wall slots 130, 134 are sized to receive the roll-up cover wall 52 therein.

In another embodiment the first wall raising arm 112 may have a bent portion that results in it extending over the bed 20 of the pick up truck 14. The second, third and fourth wall raising arms 114, 116, 118 would have corresponding bent portions.

As shown in FIG. 2, as the first, second extendable and retractable post assemblies 60a, 60b are raised the first and second wall raising arms 112, 114 are raised, and as the third and fourth extendable retractable post assemblies 62a, 62b are raised the third and fourth wall raising arms 116, 118 are raised and the first and second roll-up sidewalls 40, 48 are raised, and a portion of the roll-up cover wall 52 is also be raised. To extend the roll-up cover wall 52 completely over the bed 20, there is provided a winch 90 or other pull mechanism. For example, the roll-up cover wall 52 is a power roll, or has a sprocket and tooth design, or a cable and pulley system, that is connected to the leading edge guide bar 57 secured to the roll-up cover wall 52 with, for example a wire 92 (shown in dashed lines in FIG. 5). The winch 90 is disposed in a tailgate recess 61 defined between the inner tailgate side 33 and outer tailgate side 35.

When the winch 90 is powered the leading edge guide bar 57 secured to the roll-up cover wall 52 moves through the first and third arm cover wall slots 122, 130 defined in the first and third wall raising arms 112, 116, through the first cover receiving groove 54a defined in the first guide bar 54, through the second cover receiving groove 56a defined in the second guide bar 56, and through the second and fourth arm cover wall slots defined in the second and fourth wall raising arms 114, 118 until it abuts the tailgate 23. At this point the bed 22 of the pickup truck 14 is completely enclosed by the first and second roll-ups sidewalls 40, 48 and the roll-up cover wall 52. The roll-up cover wall 52 is capable of automatically retracting in an embodiment wherein the roll-up cover wall 52 is spring biased, that is there spring tension on it as it is pulled over the bed 22.

In another embodiment the roll-up cover wall 52 is powered with cover wall motor 52a (shown in FIG. 5) that is under the control of the controller 150 that drives the roll-up cover wall 52 such that it can be extended and retracted over the bed 20 in the manner described above. In such an embodiment the winch 90 is not needed. Motors for extending and retracting roll-up walls made of slats are well known to those have ordinary skill in the are and are therefore not described in greater detail herein.

Thus, as shown in FIG. 25 the first and second roll-up sidewalls 40, 48 are fully extended and the roll-up cover wall 52 is fully extended together they define a cap assembly interior 100 that is weather tight and impervious to wind and rain and the surrounding environment. In addition, the user may also opt to raise or lower one of the first and second roll-up sidewalls 40, 48 to load or unload items supported on the bed 20 of the pickup truck 14. The rear portion of the roll-up cover wall 52 can be retracted as needed to gain access to the bed 20 and objects supported thereon. In addition, in another embodiment a secondary opening system specific to the rear portion could be added.

The previously mentioned controller 150 is wired to the above-described driver mechanism 64 and winch 90 and motors 52a, and hydraulic and pneumatic components in other embodiments, such that a user need only depress a button to automatically extend and retract any or all of the roll-up cover wall 52, the first roll-up sidewall 40, and the second roll-up side wall 48. Controllers 150 and wiring a controller to motors, hydraulic systems and pneumatic systems is well known to those having ordinary skill in the art and are therefore not described in greater detail herein. The controller 150 may also be wireless in one of the preferred embodiments. Power for the controller 150 and the components described herein may be derived from the battery of the pickup truck 14.

It is pointed out that as shown in FIG. 26, the roll-up cover wall 52 is also capable of serving as a tonneau type cover by simply extending the roll-up cover wall 52 as described above and not extending the first and second roll-up sidewalls 40, 48. In another embodiment the first and second roll-up sidewalls 40, 48 and roll-up cover wall 52 are capable of being manually raised and lowered and held in place with, for example pins 108 (shown in dashed line in FIG. 5) that extend through the first, second, third and fourth wall raising arms 112, 114, 116, 118 and into the outer sidewall panels 32, 44. In such an embodiment the extendable and retractable post assemblies are not required. In another embodiment the roll-up cover wall 52 is capable of being manually extended and retracted.

Figure 33:
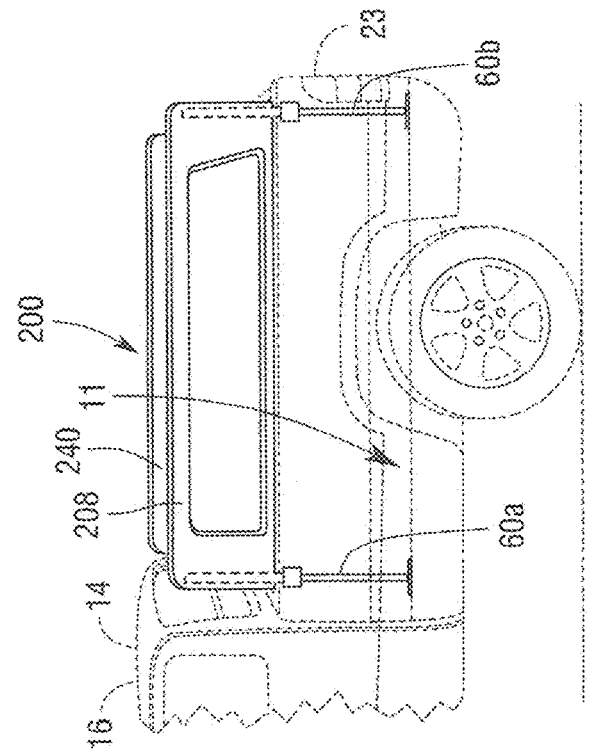
Figure 34:
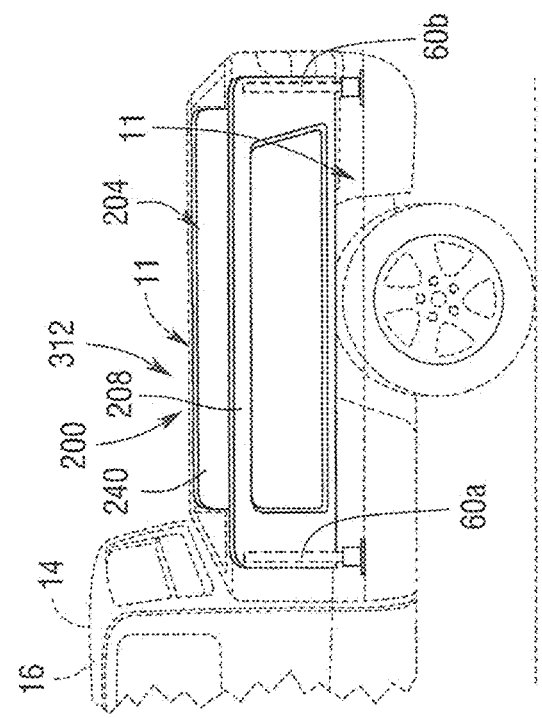
Figure 35:
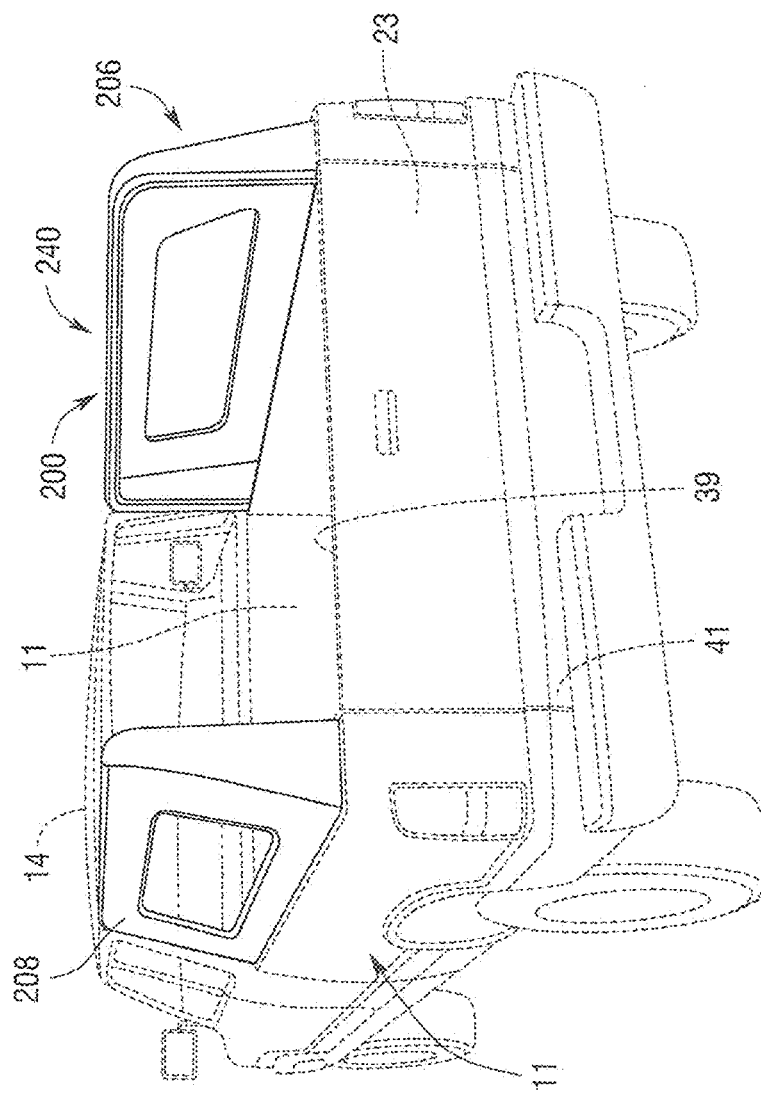

In another embodiment shown in FIGS. 27-36 there is an extendable and retractable panel cap 200 that includes a panel cap assembly 202 and the previously described bed assembly 11. As shown in FIG. 33 the panel cap assembly 202 is in a panel cap assembly retracted position 204 and as shown in FIG. 36 the panel cap assembly 202 is in a panel cap assembly extended position 206.

In this embodiment the above-described first and second roll-up sidewalls 40, 48, and first, second wall, third and fourth wall raising arms 112, 114, 116, 118 are absent. The first, second, third and fourth extendable and retractable post assemblies 60a, 60b, 62a, 62b are structurally the same as previously described, but instead of having the first, second wall, third and fourth wall raising arms 112, 114, 116, 118 mounted on them, the first and second extendable and retractable post assemblies 60a, 60b have a first cap panel 208 mounted thereon, and the third and fourth extendable retractable post assemblies 62a, 62b have a second cap panel 240 mounted thereon. FIG. 32A is a sectional view showing the first cap panel 208 mounted on the first extendable retractable post assembly 60a. It is to be understood that the first cap panel 208 is also mounted on the second extendable and retractable post assembly 62 in the same manner, and the second cap panel 240 is mounted on the third and fourth extendable and retractable post assemblies 62a, 62b in the same manner.

The first cap panel 208 is shown in FIGS. 27-30. The first cap panel 208 has a first cap panel base wall 210 and has opposed first and second cap panel end walls 214, 216 that extend from the first cap panel base wall 210, and the first cap panel 208 has a first cap panel side wall 218, and has a first cap panel cover supporting end wall 220 that faces the first cap panel base wall 210. The first panel end wall 214 has a first tapered portion 222, and second panel end wall 216 has a second tapered portion 224. Each of the first and second tapered portions 222, 224 taper in a direction from the first cap panel base wall 210 to the first cap panel cover supporting end wall 220 such that the first and second cap panel end walls 214, 216 have a truncated triangular shape designated by reference number 226.

As shown in FIG. 29 the first cap panel 208 also defines a first cap panel sliding slot 230 for receiving the above-described roll-up cover wall 52 therein. The first cap panel sliding slot 230 extends along the first and second cap panel wall ends 214, 216, and extends along the first cap panel cover supporting end wall 220. The first cap panel side wall 218 defines a first cap panel window opening 232 and a first cap panel window 234 is disposed in the first cap panel window opening 232 and supported by the supported by the first cap panel side wall 218. In other embodiments the first panel cap panel window 232 is absent and the first cap panel sidewall 218 has no openings.

The second cap panel 240 is shown in FIGS. 30-32. The second cap panel 240 has a second cap panel base wall 244 and has opposed first and second cap panel end walls 246, 248 that extend from the second cap panel base wall 244, and the second cap panel 240 has a second cap panel side wall 250, and has a second cap panel cover supporting end wall 252 that faces the second cap panel base wall 244. The first panel end wall 246 has a first tapered portion 254, and second panel end wall 248 has a second tapered portion 256. Each of the first and second tapered portions 254, 256 taper in a direction from the second cap panel base wall 244 to the second cap panel cover supporting end wall 252 such that the first and second cap panel end walls 246, 248 have a truncated triangular shape designated by reference number 258.

The second cap panel 240 also defines a second cap panel sliding slot 260 for receiving the above-described roll-up cover wall 52 therein. The second cap panel sliding slot 260 extends along the first and second cap panel wall ends 246, 248, and extends along the second cap panel cover supporting end wall 252. The second cap panel side wall 250 defines a second cap panel window opening 262 and a second cap panel window 264 is disposed in the first cap panel window opening 262 and supported by the second side wall 250. In other embodiments the second panel cap panel window 264 is absent and the second cap panel sidewall 250 has no openings.

In another embodiment, the first and second cap panels 208, 240 are structurally identical.

As shown in FIGS. 33-36 the panel cap assembly 202 is capable of being moved from the panel cap assembly retracted position 204 to the panel cap assembly extended position 206. The first and second extendable and retractable post assemblies 60a, 60b on which the first cap panel 208 is mounted, and the third and fourth extendable retractable post assemblies 62a, 62b on which the second cap panel 240 is mounted are capable of moving the panel cap assembly 200 toward and away from the bed 20 of the pickup truck 14.

In FIG. 36 the panel cap assembly cap 202 is it is in the panel cap assembly extended position 206, and in FIG. 33 the panel cap assembly 202 is in the panel cap retracted position 204. When the panel cap assembly 202 is in the panel cap assembly retracted position 204 it is disposed in the previously described cap assembly recess 106 defined by the bed assembly 11.

The roll-up cover wall 42 is supported on the and fitted in the first cap panel sliding slot 230 and fitted in the second cap panel sliding slot 260 such that the roll-up cover wall 42 can be slid back an forth over the bed 20 of the pickup truck 14 in the manner described above. That is, the operation, motion and function of the roll-up cover 42 wall is the same as described above and therefore is not described herein again. The roll-up cover wall 52 is also capable of serving as a tonneau cover by extending the roll-up cover wall 52 as described above and not extending the first cap panel 208 and not extending the second cap panel 240 and would appear substantially the same as what is shown in FIG. 26. The roll-up cover wall 42 may be powered with a motor such that it can be extended and retracted automatically as previously described.

In another preferred embodiment shown in FIGS. 37-44 there is extendable and retractable cab deployable panel cap 300 having a deployable panel cap assembly 301 and having the previously described bed assembly 11. The deployable cap assembly includes the previously described first and second cap panels 208, 249, and a cab panel 340. The deployable panel cap assembly 301 has the same first and second extendable retractable post assemblies 60a, 60b on which the first panel cap 208 is mounted, and has the same third and fourth extendable retractable post assemblies 62a, 62b on which the second cap panel 240 is mounted as described immediately above in connection with the extendable and retractable panel cap 200. Therefore, these components will not be described herein again. In addition, a cab panel housing 317 (shown in FIGS. 42, 45, and 46) is mounted on the cab 16, and the cab 16 and the cab panel housing 317 define a cab panel recess 321 that is sized to receive the cab panel 340 therein.

In this embodiment the roll-up cover wall 52 is absent. The deployable panel cap assembly 301 includes an end panel 302 as shown in FIGS. 37-40. The previously described first cap panel 208 and the second cap panel 240 are connected to the end panel 302. The end panel 302 has opposed first and second end panel end edges 303, 305 and opposed first and second end connecting edges 307, 309. The first connecting edge 307 is connected to the first cap panel 208, and the second connecting edge 309 is connected to the second cap panel 240 in the same manner as shown in FIGS. 38-40. The end panel 302 thus raises and lowers in unison with the raising and lowering of the first cap panel 208 and the second cap panel 240. The end panel 302 may define an end panel opening 304 into which and end panel window 306 is fitted and secured. This provides the driver of the pickup truck 14 to visually inspect to the bed 20. The end panel 302 fits in the cross wall recess 50 defined in the bed assembly 11. In one embodiment the end panel 302 defines end first and second end panel slots 314, 316 that are sized such that the cab panel 340 can be slid through the end panel slots 314, 316. In another embodiment, the end panel 302 is powered by the truck 14 and raised and lowered in the same manner and with the same mechanisms that are used to power raising and lowering of windows and hatches in a vehicle. The construction, use and operation of mechanisms for raising and lowering power windows and panels is well known to those having ordinary skill in the are and are therefore not described in greater detail herein.

Reference is now made to FIG. 41. As previously described, the tailgate 23 has inner and outer tailgate sides 33, 35 and the pivot end wall 41, and together they define a tailgate recess 61. The deployable cap panel assembly 301 further includes a tailgate extendable and retractable post assembly 320 that is housed in the tailgate recess 61 and between the inner and outer tailgate sides 33, 35 (FIG. 5), and the tailgate extendable and retractable post assembly 320 is mounted on the pivot end wall 41. The tailgate extendable and retractable post assembly 320 is structurally the same as the previously described first extendable and retractable post assembly 60a and thus is not described in again herein. The tailgate extendable and retractable post assembly 320 has mounted thereon a tailgate panel 322 that defines a tailgate panel opening 324 and tailgate window 326 is fitted in the tailgate panel opening 324. The tailgate panel 322 has opposed first and second tailgate engagement edges 328, 330 that are capable of sliding in and out of the first cap panel sliding slot 230 and the second cap panel sliding slot 260. As shown in FIG. 41 the tailgate panel 322 is in a tailgate extended position 334. In another embodiment the tailgate panel 322 is interconnected with the first and second first cap panels 208, 240 and thus raises and lowers as the first and second cap panels 208, 240 raise and lower. In one embodiment the tailgate panel 322 also defines first and second tailgate panel slots 336, 338 that are sized such that the cab panel 340 can be slid through the first and second tailgate panel slots 336, 338. In another embodiment the tailgate extendable and retractable post assembly 320 is absent and the tailgate panel 322 is powered by the truck 14 and is raised and lowered in the same manner and with the same mechanisms that are used to power windows and to power hatches in a vehicle. The construction, use and operation of mechanisms for raising and lowering power windows and panels is well known to those having skill in the art and are therefore not described in greater detail herein.

As shown in FIGS. 37, 38 and 42-44 the deployable cab panel assembly 301 also has includes the cab panel 340 that is supported on the cab 16 of the pickup truck 14. The cab panel 340 is positioned in the cab panel recess 321 defined by the cab housing 317 that is mounted on the cab 16. The cab panel is in a cab panel retracted position 342 in FIG. 42 and supported on the cab 16. The cab panel 340 is movable to a cab panel extended position 344 as shown by the arrows designated D in FIGS. 42-44. In FIG. 44 the cab panel 340 is in the cab panel extended position 344. The cab panel 340 is movable back to the cab panel retracted position 342 as indicated by the arrow designate C in FIG. 44. Thus, FIGS. 42-44 shows the cap panel 340 as it is being moved from the cab panel retracted position 342 to the cab panel extended position 344, and back to the cab panel retracted position 342. As shown in FIG. 44, the cap panel 340 covers the bed 20 when in the cab panel extended position 344. In this embodiment, the panel length designated PL is equal to the bed length designated BL such that the cab panel 340 is in the form a solid panel. When the cab panel 340 is in the cab panel extended position 344 the cab panel 340 is supported on the first and second cap panels 208, 240, that is, the cab panel 340 slides into the previously described first and second cap panel sliding slots 230, 260. The cab panel 240 is also capable of being slid through the first and second end panel slots 314, 316 and the first and second tailgate panel slots 336, 338.

A cab panel drive mechanism 348 is shown in FIG. 44 that is mounted on the cab 16 and is operatively associated with the cab panel 340 and is capable of moving the cab panel between the cab panel retracted position 342 and the cab panel extended position 344. As shown in FIG. 44, because the length of the bed 22 designated BL equals the length of the cab 16 designated PL the cab panel 340 may be embodied as a solid panel 341 that when driven out covers the entire bed 22 when in the cab extended position 344. The cab panel drive mechanism 348 for moving the cab panel 340 is an electric powered hydraulic pump 352 connected to the cab 16 and operatively associated with a cylinder 354 that is connected to the cab panel 340 such that when activated the cab panel 340 is moved to and from the cap panel retracted and extended positions 342, 344 and vice versa. The cab panel drive mechanism 348 is under the control of the controller 150.

As shown in FIG. 44 the deployable cap panel assembly 301 is in a deployable cap panel assembly extended position 390. The deployable cap panel assembly 301 is in a deployable cap assembly retracted position 392 as shown in FIG. 42 wherein the cab panel 340 is in the cab panel retracted position 342, and the first and second cap panels 208 and 240 are retracted, and the end panel 302 and the tailgate panel 322 are retracted.

FIG. 45 is a side view of the pickup truck 14 in an another embodiment wherein the extendable and retractable cab deployable panel cap 300 has a deployable multi-panel cab assembly 400 having a plurality of cab panels 340, and FIG. 46 is a perspective view thereof. As shown in FIG. 45, as a first cab panel 340a pushed out of the cab panel housing 317 it also draws a second cab panel 340b to which it is connected out of the cab panel housing 317. The first and second panel caps 208, 240 support the first and second cab panels 340a, 340b. The first and second cab panels 340a, 340b maybe fitted in first and second cab panel slots 343, 345 (shown in FIGS. 28 and 31) defined in the first and second panel caps 208, 240. In other preferred embodiments there are more than first and second cab panels 340a, 340b, for example there may be three or more dependent on the bed length BL of the bed 20 that needs to be covered.

In another embodiment the cab panel 340 may be embodied as a roll-up cab wall 364 (shown in FIG. 43 and it is understood that the cab panel 340 shown in FIG. 43 would be absent) that is extended and retracted with a roll-up cab motor 366 mounted on the cab 16. When the cab panel 340 is in the cab panel extended position 344 the cab panel 340 is supported on the first and second cap panels 208, 240, that is, the cab panel 340 slides into the previously described first and second cap panel sliding slots 230, 260. In this embodiment the bed length designated BL can be greater than the cab length CL because the roll-up cab wall 364 can be any desired length to cover the bed 20.

In other embodiments other cab panel drive mechanisms may be utilized. In other embodiments, the cab panel 340 may be raised off the cab 16 and slid into the previously described first and second cap panel sliding slots 230, 260 in a manner such as a convertible vehicle functions, or moved manually.

In other embodiments there are other ways of extending and retracting the cab panel 340. For example, the cap panel 340 can be moved with a telescopic cable system that pushes and pulls the cab panel 340. In another embodiment there is an electric motor operatively associated with a gear and track and connected to the cab panel 340. In another embodiment, the cab panel 340 may be operatively associated with a scissors mechanism the pushes and retracts the cap panel 340. In other embodiments hydraulic and pneumatic cylinders, screw drives, electric jacks, lever and fulcrum, and folding systems may be used to extend and retract the cab panel 40.

In another the cab panel 340 and first and second cab panels 340a, 340b are manually slid on the first cap panel 208 and the second cap panel 240, or the cab panel 340 is stored in the cab 16 and manually moved into the first and second cap panel sliding slots 230, 260, or the cab panel 340 may be stored on the bed 20 and then manually slid into the first and second cap panel sliding slots 230, 260 when needed. In such embodiments the cab panel housing 317 may not be needed. In another embodiment the cab panel 340 can be supported on either of the first and second bed sidewalls 26, 28 with suitable brackets.

In addition, although the above has been described in connection with covering a bed 20, it is to be understood that the invention can be used to cover any cargo area, for example it could be used with a trailer. It could also be adapted to be fitted on vehicles that do not have traditional shaped beds.

Thus, the extendable and retractable truck cap 8, the extendable and retractable panel cap 200, and the extendable and retractable cab deployable panel cap 300 solve the problems associated with fixed solid structure bed caps that cannot be moved or adjusted.

As previously mentioned the extendable and retractable truck cap 8, the extendable and retractable panel cap 200, and the extendable and retractable cab deployable panel cap 300 will be typically installed on the pickup truck 14 at the point of manufacture. In addition, it is possible for owners of pickup trucks that want to install one of the retractable truck cap 8, the extendable and retractable panel cap 200, and the extendable and retractable cab deployable panel cap 300 on their own pickup trucks. The owner would purchase the first, second, third, and fourth extendable and retractable post assemblies 60a, 60b, 62a, 62b and mount them on the bed of his or her pickup truck. Then, the owner would select one of the cap assembly 10, or the panel cap assembly 202, or the deployable cap panel assembly 301 and mount it on the first, second, third, and fourth extendable and retractable post assemblies 60a, 60b, 62a, 62b. Some minor modifications to the bed 20 of the pickup truck might be required for fitting purposes, but it is to be understood that the retractable truck cap 8, the extendable and retractable panel cap 200, and the extendable and retractable cab deployable panel cap 300 can be sold in the aftermarket.

It will be appreciated by those skilled in the art that while the extendable and retractable truck cap 8, the extendable and retractable panel cap 200, and the extendable and retractable cab deployable panel cap 300 have been described in detail herein, the extendable and retractable truck cap 8, the extendable and retractable panel cap 200, and the extendable and retractable cab deployable panel cap 300 not necessarily so limited and other examples, embodiments, uses, modifications, and departures from the embodiments, examples, uses, and modifications may be made without departing from the extendable and retractable truck cap 8, the extendable and retractable panel cap 200, and the extendable and retractable cab deployable panel cap 300 and all such embodiments are intended to be within the scope and spirit of the appended claims.

What is claimed is:

1. An extendable and retractable truck cap for use with a truck having a bed, the extendable and retractable truck cap comprising:
   a bed assembly having:
   a bed,
   opposed first and second bed sidewalls that extend from the bed and the first bed sidewall has inner and outer sidewall panels and the second bed sidewall has inner and outer sidewall panels;
   the inner and outer sidewall panels of the first bed sidewall and the bed define a first sidewall recess and the inner and outer sidewall panels of the second bed sidewall define a second sidewall recess;
   a bed cross wall that extends from the bed and the bed cross wall has inner and outer cross wall panels and the outer cross wall panel extends from the outer sidewall panel of the first bed sidewall to the outer sidewall panel of the second bed sidewall, and the inner cross wall panel extends from the inner cross wall panel of the first bed sidewall to the inner sidewall panels of the second bed sidewall and the inner and outer cross wall panels define a cross wall recess, and together the first and second sidewall recesses and the cross wall recess form a cap assembly recess;
   a cap assembly positioned in the cap assembly recess and the cap assembly further includes a first extendable and retractable post assembly having a housing that is mounted on the bed and the housing defines an internal locking arm slot that extends along the housing;
   the first extendable and retractable post assembly has the drive mechanism for raising and lowering a first wall raising arm, and the drive mechanism includes an actuator having an electric powered motor that is operatively associated with a screw having an external thread; and wherein the actuator converts electrical energy into torque that is delivered to the screw to rotate the screw clockwise and counterclockwise;
   a controller operatively associated actuator such that rotation of the motor and screw can be controlled, and wherein the drive mechanism also includes a carriage having an internal thread that is threaded to the screw; and,
   wherein the first wall raising arm is mounted on the carriage of the first extendable and retractable post assembly, and the first wall raising arm has an internal arm thread that is threaded to the screw, and a locking arm extends from the carriage and the locking arm is fitted in the internal locking arm slot to prevent the first wall-raising arm from rotating as the first wall raising arm is being raised and lowered when the screw is rotated to move the first wall raising arm up or down to relative to the bed.

2. The extendable and retractable truck cap truck cap according to claim 1 wherein the cap assembly further includes a second extendable and retractable post assembly that is mounted on the bed and positioned in the first cap assembly recess, and the truck cap assembly includes third and fourth extendable and retractable post assemblies that are mounted on the bed and positioned in the second sidewall recess.

3. The extendable and retractable truck cap truck cap according to claim 1 wherein the cap assembly further includes:
   a second wall raising arm that is mounted on the second extendable retractable post assembly;
   a third wall raising arm that is mounted on the third extendable retractable post assembly; and
   a fourth wall raising arm that is mounted on the fourth extendable retractable post assembly.

4. The extendable and retractable truck cap truck cap according to claim 3 wherein the cap assembly further includes a first roll-up sidewall and the first roll-up sidewall is connected to the first and second wall raising arms and is positioned in the first sidewall recess; and the cap assembly includes a second roll-up sidewall that is connected to the third and fourth wall raising arms and positioned in the second sidewall recess.

5. The extendable and retractable truck cap truck cap according to claim 4 wherein the cap assembly further includes a roll-up cover wall that is connected to the first and second wall raising arms and the roll-up cover wall is positioned in the and cross wall recess.

6. The extendable and retractable truck cap truck cap according to claim 5 wherein as the first, second, third and fourth wall raising arms are extended by the first, second, third and fourth extendable retractable post assemblies, first and second roll-up sidewalls and the roll-up cover wall are unwound and the first, second, third and fourth wall raising arms and the first and second roll-up sidewalls and the roll-up cover wall move such that the cap assembly moves from a cap assembly retracted position to a cap assembly extended position.

7. The extendable and retractable truck cap truck cap according to claim 5 wherein a winch is connected to the roll-up cover wall such that the roll-up cover wall can be pulled and unwound and slid over and supported on the first, second, third and fourth wall raising arms and the first, second, third, and fourth extendable retractable post assemblies such that the roll-up cover wall covers the bed.

8. The extendable and retractable truck cap truck cap according to claim 7 wherein the roll-up cover wall does not move as the cap assembly moves from the cap assembly extended position such that the roll-up cover covers the bed when the cap assembly is in the cap assembly retracted position.

9. The extendable and retractable truck cap according to claim 2 wherein each of the second, third and fourth extendable retractable post assemblies has a drive mechanism for extending and retracting the second, third, and fourth wall raising arms.

10. An extendable and retractable panel cap for use with a truck having a bed, the extendable and retractable panel cap comprising:
a bed assembly having:
a bed,
opposed first and second bed sidewalls that extend from the bed and the first bed sidewall has inner and outer sidewall panels and the second bed sidewall has inner and outer sidewall panels;
the inner and outer sidewall panels of the first bed sidewall and the bed define a first sidewall recess and the inner and outer sidewall panels of the second bed sidewall define a second sidewall recess;
a bed cross wall that extends from the bed and the bed cross wall has inner and outer cross wall panels and the outer cross wall panel extends from the outer sidewall panel of the first bed sidewall to the outer sidewall panel of the second bed sidewall, and the inner cross wall panel extends from the inner cross wall panel of the first bed sidewall to the inner sidewall panes of the second bed sidewall and the inner and outer cross wall panels define a cross wall recess, and together the first and second sidewall recesses and the cross wall recess form a cap assembly recess;

a panel cap assembly positioned in the cap assembly recess, and the panel cap assembly further includes first, second, third and fourth extendable and retractable post assemblies that are mounted on the bed and the housings define internal locking arm slots that extends along the housings;
a first cap panel is mounted on the first and second extendable and retractable post assemblies and a second cap panel mounted on the third and fourth extendable retractable post assemblies;
wherein each of the first, second, third and fourth extendable and retractable post assemblies has a drive mechanism for raising and lowering the first and second cap panels, and each drive mechanism includes an actuator having an electric powered motor that is operatively associated with a screw having an external thread;
wherein the actuator converts electrical energy into torque that is delivered to the screw to rotate the screw clockwise and counterclockwise;
a controller is operatively associated with each actuator such the rotation the motor and screw can be controlled, and wherein the drive mechanisms also include carriages, and each carriage has an internal thread that is threaded to one of the screws; and
wherein the first, second, third and fourth extendable and retractable post assemblies are mounted on the carriages, and a respective raising arm of each post assembly an internal arm thread that is threaded to the screw, and a locking arm extends from the carriage and the locking arm is fitted in a respective internal locking arm slot to prevent the first and second cap panels from rotating as the first and second cap panels are raised and lowered relative to the bed.

11. The extendable and retractable panel cap according to claim 10 wherein the panel cap assembly further includes a roll-up cover wall that is connected to the first and second cap panels and the roll-up cover wall is positioned in the and cross wall recess.

12. The extendable and retractable panel cap according to claim 11 wherein the roll-up cross wall is unwound as it is raised and the first and second cap panels and the roll-up cross wall move such that the panel cap assembly moves from a panel cap assembly retracted position to a panel cap assembly extended position.

13. The extendable and retractable panel cap according to claim 12 wherein the first cap panel has a first cap panel sliding slot and the second cap panel has a sliding slot sized to receive the roll-up cover wall therein such that as the roll-up cover wall is moved over the bed it slides through the first and second cap panel sliding slots.

14. An extendable and retractable cab deployable panel cap for use with a truck having a cab and a bed, the extendable and retractable cab deployable panel cap comprising:
a bed assembly having:
a bed,
opposed first and second bed sidewalls that extend from the bed and the first bed sidewall has inner and outer sidewall panels and the second bed sidewall has inner and outer sidewall panels;
the inner and outer sidewall panels of the first bed sidewall and the bed define a first sidewall recess and the inner and outer sidewall panels of the second bed sidewall define a second sidewall recess;
a bed cross wall that extends from the bed and the bed cross wall has inner and outer cross wall panels and the outer cross wall panel extends from the outer sidewall panel of the first bed sidewall to the outer sidewall panel of the second bed sidewall, and the inner cross wall panel extends from the inner cross wall panel of the first bed sidewall to the inner sidewall panes of the second bed sidewall and the inner and outer cross wall panels define a cross wall recess, and together the first and second sidewall recesses and the cross wall recess form a deployable cap assembly recess;

a tailgate pivotally connected to the bed and the tailgate having a tailgate base wall and inner and outer tailgate sides extend from the tailgate base wall and the tailgate base wall and the inner and outer tailgate sides define a tailgate recess;

a deployable panel cap assembly having a first cap panel and a second cap panel, an end panel and a tailgate panel wherein the first cap panel and the second cap panel and the end panel are positioned in the deployable cap assembly recess and the tailgate panel is positioned in the tailgate recess; and, a cab housing is mounted on the cab of the truck, and the cab housing defines a cab panel recess and a cab panel is supported on the cab and is capable of being moved in and out of the cab panel recess;

wherein the deployable cap panel assembly includes first, second, third and fourth extendable and retractable post assemblies, and wherein a first cap panel is mounted on the first and second extendable and retractable post assemblies and a second cap panel mounted on the third and fourth extendable retractable post assemblies;

wherein each of the first, second, third and fourth extendable and retractable post assemblies has a housing that is mounted on the bed and the housings define internal locking arm slots that extends along the housings;

wherein each of the first, second, third and fourth extendable and retractable post assemblies has a drive mechanism for raising and lowering the first and second cap panels, and each drive mechanism includes an actuator having an electric powered motor that is operatively associated with a screw having an external thread, and wherein the actuator converts electrical energy into torque that is delivered to the screw to rotate the screw clockwise and counterclockwise;

a controller operatively associated actuator such the rotation the motor and screw can be controlled, and wherein the drive mechanisms also include carriages, and each carriage has an internal thread that is threaded to one of the screws; and, wherein the cap panels are mounted on the carriages of the first, second, third and fourth extendable and retractable post assemblies, and a respective raising arm of each post assembly has an internal arm thread that is threaded to the screw, and a locking arm extends from each carriage and each locking arm is fitted in a respective internal locking arm slot to prevent the first and second cap panels from rotating as the first and second cap panels are raised and lowered relative to the bed.

15. The extendable and retractable cab deployable panel cap according to claim 14 wherein the first and second extendable and retractable post assemblies are mounted on the bed and positioned in the first cap assembly recess, and the third and fourth extendable retractable post assemblies that are mounted on the bed and positioned in the second sidewall recess, and includes a tailgate extendable and retractable post assembly mounted on the tailgate base wall.

16. The extendable and retractable cab deployable panel cap according to claim 15 wherein the cab panel that is supported on the cab and is capable of being slid, and wherein the first cap panel defines a first cap panel sliding slot and the second cap panel defines a second sliding slot adapted to receive the cab panel therein such that the cab panel is capable of being moved into the first and second cap panel sliding slots and over the bed of the truck.

17. The extendable and retractable cab deployable panel cap according to claim 16 further including a cab panel drive mechanism, and the cab panel drive mechanism is mounted on the cab and connected to the cab panel such that when powered the cab panel drive mechanism moves the cab panel over the first and second cap panels in order to move the cab panels over the bed.

* * * * *